(12) United States Patent
Miao

(10) Patent No.: US 12,207,246 B2
(45) Date of Patent: Jan. 21, 2025

(54) DYNAMIC SOFT RESOURCE SIGNALING IN RELAY NETWORKS

(71) Applicant: Apple Inc., Cupertino, CA (US)

(72) Inventor: Honglei Miao, Munich (DE)

(73) Assignee: Apple Inc., Cupertino, CA (US)

( * ) Notice: Subject to any disclaimer, the term of this patent is extended or adjusted under 35 U.S.C. 154(b) by 469 days.

(21) Appl. No.: 17/439,761

(22) PCT Filed: May 28, 2020

(86) PCT No.: PCT/US2020/034968
§ 371 (c)(1),
(2) Date: Sep. 15, 2021

(87) PCT Pub. No.: WO2020/243339
PCT Pub. Date: Dec. 3, 2020

(65) Prior Publication Data
US 2022/0191893 A1    Jun. 16, 2022

Related U.S. Application Data

(60) Provisional application No. 62/855,494, filed on May 31, 2019.

(51) Int. Cl.
*H04W 72/1263* (2023.01)
*H04W 72/0446* (2023.01)
(Continued)

(52) U.S. Cl.
CPC ... *H04W 72/1263* (2013.01); *H04W 72/0446* (2013.01); *H04W 72/20* (2023.01); *H04W 72/23* (2023.01); *H04W 88/14* (2013.01)

(58) Field of Classification Search
CPC ......... H04W 72/1263; H04W 72/0446; H04W 72/20; H04W 72/23; H04W 88/14; H04B 7/15542
See application file for complete search history.

(56) References Cited

U.S. PATENT DOCUMENTS

| 2014/0029508 | A1 | 1/2014 | Kim et al. |
| 2019/0110266 | A1 | 4/2019 | Abedini et al. |

(Continued)

FOREIGN PATENT DOCUMENTS

| CN | 105308999 | 2/2016 |
| CN | 115299150 | 11/2022 |
| WO | WO 2020/144654 | 7/2020 |

OTHER PUBLICATIONS

[No Author Listed] 3GPP TR 38.874 1.0.0 (2018-13), "3rd Generation Partnership Project; Technical Specification Group Radio Access Network; Study on Integrated Access and Backhaul (Release 15)," 111 pages.

(Continued)

*Primary Examiner* — Ashley Shivers
(74) *Attorney, Agent, or Firm* — Fish & Richardson P.C.

(57) ABSTRACT

Disclosed are methods, systems, apparatus, and computer programs for determining in a new radio (NR) integrated access and backhaul (IAB) system available soft resources for an IAB node. In one aspect, a method includes determining, by a mobile termination (MT) of the IAB node, a time-domain soft resource configuration for a distributed unit (DU) of the IAB node. The method further includes transmitting the time-domain soft resource configuration to the DU.

20 Claims, 12 Drawing Sheets

(51) Int. Cl.
*H04W 72/20* (2023.01)
*H04W 72/23* (2023.01)
*H04W 88/14* (2009.01)

(56) References Cited

U.S. PATENT DOCUMENTS

| | | | |
|---|---|---|---|
| 2020/0128539 A1 | 4/2020 | Abedini et al. | |
| 2020/0145965 A1 | 5/2020 | Luo et al. | |
| 2020/0229271 A1 | 7/2020 | You et al. | |
| 2020/0351930 A1* | 11/2020 | Luo | H04W 24/08 |
| 2021/0368481 A1 | 11/2021 | Jo et al. | |
| 2021/0377922 A1 | 12/2021 | Luo et al. | |
| 2021/0377936 A1 | 12/2021 | Yuan et al. | |
| 2022/0060247 A1* | 2/2022 | Harada | H04B 7/15542 |
| 2022/0078789 A1 | 3/2022 | Harada et al. | |
| 2022/0182977 A1 | 6/2022 | Miao | |
| 2022/0217661 A1* | 7/2022 | Yokomakura | H04B 7/155 |
| 2022/0217772 A1 | 7/2022 | Harada et al. | |

OTHER PUBLICATIONS

[No Author Listed] 3GPP TR 38.874 v16.0.0 (Dec. 2018), "3rd Generation Partnership Project; Technical Specification Group Radio Access Network; NR; Study on Intefrated Access and Backhaul (Release 16)," Dec. 2018, 111 pages.

[No Author Listed] 3GPP TS 23.402 V15.3.0 (Mar. 2018), "3rd Generation Partnership Project; Technical Specification Group Services and System Aspects; Architecture enhancements for non-3GPP accesses (Release 15)," Mar. 2018, 314 pages.

[No Author Listed] 3GPP TS 38.211 V15.5.0 (Mar. 2019), "3rd Generation Partnership Project; Technical Specification Group Radio Access Network; NR; Physical channels and modulation (Release 15)," Mar. 2019, 96 pages.

[No Author Listed] 3GPP TS 38.212 V15.5..0 (Mar. 2019), "3rd Generation Partnership Project; Technical Specification Group Radio Access Network; NR; Multiplexing and channel coding (Release 15)," Mar. 2019, 101 pages.

[No Author Listed] 3GPP TS 38.213 V15.5.0 (Mar. 2019), "3rd Generation Partnership Project; Technical Specification Group Radio Access Network; NR; Physical layer procedures for control (Release 15)," Mar. 2019, 104 pages.

[No Author Listed] 3GPP TS 38.300 V15.5.0 (Mar. 2019), "3rd Generation Partnership Project; Technical Specification Group Radio Access Network; NR; NR and NG-RAN Overall Description; Stage 2 (Release 15)," Mar. 2019, 97 pages.

[No Author Listed] 3GPP TS 38.331 v15.5.0 (Mar. 2019), "3rd Generation Partnership Project; Technical Specification Group Radio Access Network; NR; Radio Resource Control (RRC) protocol specification (Release 15)," Mar. 2019, 491 pages.

[No Author Listed] 3GPP TS 38.473 v15.5.0 (Mar. 2019), "3rd Generation Partnership Project; Technical Specification Group Radio Access Network; NG-RAN; F1 application protocol (F1AP) (Release 15)," Mar. 2019, 198 pages.

Ericsson, "IAB resource configuration and coordination," 3GPP TSG-RAN WG1 Meeting #96bis, R1-1904834, Xi'an, China, Apr. 8-12, 2019, 7 pages.

Nokia et al., "Mechanisms for resource multiplexing among backhaul and access links," 3GPP TSG RAN WG1 #96bis, R1-1904642, Xi'an, China, Apr. 8-12, 2019, 16 pages.

PCT International Preliminary Report on Patentability in International Application No. PCT/US2020/034935, dated Nov. 16, 2021, 11 pages.

PCT International Preliminary Report on Patentability in International Application No. PCT/US2020/034968, dated Nov. 16, 2021, 10 pages.

PCT International Search Report and Written Opinion in International Application No. PCT/US2020/034935, dated Nov. 18, 2020, 19 pages.

PCT International Search Report and Written Opinion in International Application No. PCT/US2020/034968, dated Aug. 28, 2020, 16 pages.

PCT Invitation to Pay Additional Fees and, Where Applicable, Protest Fee in International Application No. PCT/US2020/034935, dated Sep. 14, 2020, 15 pages.

Qualcomm Incorporated, "Integrated Access and Backhaul for NR," 3GPP TSG RAN meeting #84, RP-191037, Newport Beach, CA, USA, Jun. 3-6, 2019, 46 pages.

Qualcomm Incorporated, "Resource Management in IAB Network," 3GPP TSG RAN WG1 Meeting #95, R1-1813419, Spokane, US, Nov. 12-16, 2018, 8 pages.

Huawei et al., "On resource coordination and dynamic scheduling in Iab," 3GPP TSG RAN WG1 Meeting #95, R1-1812201, Spokane, WA, USA, Nov. 12-16, 2018, 5 pages.

* cited by examiner

DYNAMIC SOFT RESOURCE SIGNALING IN RELAY NETWORKS

CLAIM OF PRIORITY

This application is a U.S. National Phase Application under 35 U.S.C. § 371 and claims the benefit of priority to International Application No. PCT/US2020/034968, filed on May 28, 2020, which claims priority to U.S. Provisional Patent Application No. 62/855,494 filed May 31, 2019, entitled "DYNAMIC SOFT RESOURCE SIGNALING IN RELAY NETWORKS," the entirety of which is incorporated herein by reference.

BACKGROUND

User equipment (UE) can wirelessly communicate data using wireless communication networks. To wirelessly communicate data, the UE connects to a node of a radio access network (RAN) and synchronizes with the network.

SUMMARY

The present disclosure is directed towards methods, systems, apparatus, computer programs, or combinations thereof, for determining in a new radio (NR) integrated access and backhaul (IAB) system available soft resources of an IAB node.

In accordance with one aspect of the present disclosure, a method includes determining, by a mobile termination (MT) of the node, a time-domain soft resource configuration for a distributed unit (DU) of the IAB node. The method further includes transmitting the time-domain soft resource configuration to the DU.

Other versions include corresponding systems, apparatus, and computer programs to perform the actions of methods defined by instructions encoded on computer readable storage devices. These and other versions may optionally include one or more of the following features.

In some implementations, control channel (CCH) allocations for the MT and the DU are configured such that a DU CCH is allocated in a symbol after a resource allocated for an MT CCH.

In some implementations, determining, by the MT of the IAB node, the soft resource configuration for the DU of the IAB node includes: determining that the resource allocated for the MT CCH does not include the MT CCH; in response to the determination, determining that a data resource corresponding to the resource allocated for the MT CCH is not used by the MT; and generating the soft resource configuration to indicate an available soft resource for use by the DU, where the available soft resource includes the data resource that is not used by the MT.

In some implementations, upon receipt of the soft resource configuration, the DU is configured to initiate a child link using the DU CCH allocated in a DU CCH region indicated by the soft resource configuration.

In some implementations, a gap time is scheduled between an end of the MT CCH and a start of the DU CCH, where the gap time is a time period to accommodate at least one of an MT CCH decoding delay or a DU data channel preparation time.

In some implementations, determining, by the MT of the IAB node, the soft resource configuration for the DU of the IAB node includes: receiving a go-to-sleep (GTS) downlink control information (DCI); in response to receiving the GTS DCI, suspending MT control channel (CCH) monitoring for a number of slots indicated by the GTS DCI; and indicating available soft resources for the MT GTS duration to the DU.

In some implementations, the suspending comprises not scheduling in slots in the parent link that correspond to the number of slots indicated by the GTS DCI.

In some implementations, determining the configuration includes determining one or more rate matching (RM) patterns, the one or more RM patterns comprising an RM resource allocation for MT data transmissions.

In some implementations, the process further includes: receiving, by the MT, a downlink control information (DCI) scheduling an MT data transmission, wherein the DCI is used to dynamically select one of the one or more RM patterns to be rate matched around for the data transmission.

In some implementations, the process further includes determining, in response to receipt of the DCI, a corresponding available soft resource for the DU, wherein the corresponding available soft resource is a rate matched resource according to the selected RM pattern.

DESCRIPTION OF DRAWINGS

Like reference numbers and designations in the various drawings indicate like elements.

DETAILED DESCRIPTION

Figure 1:
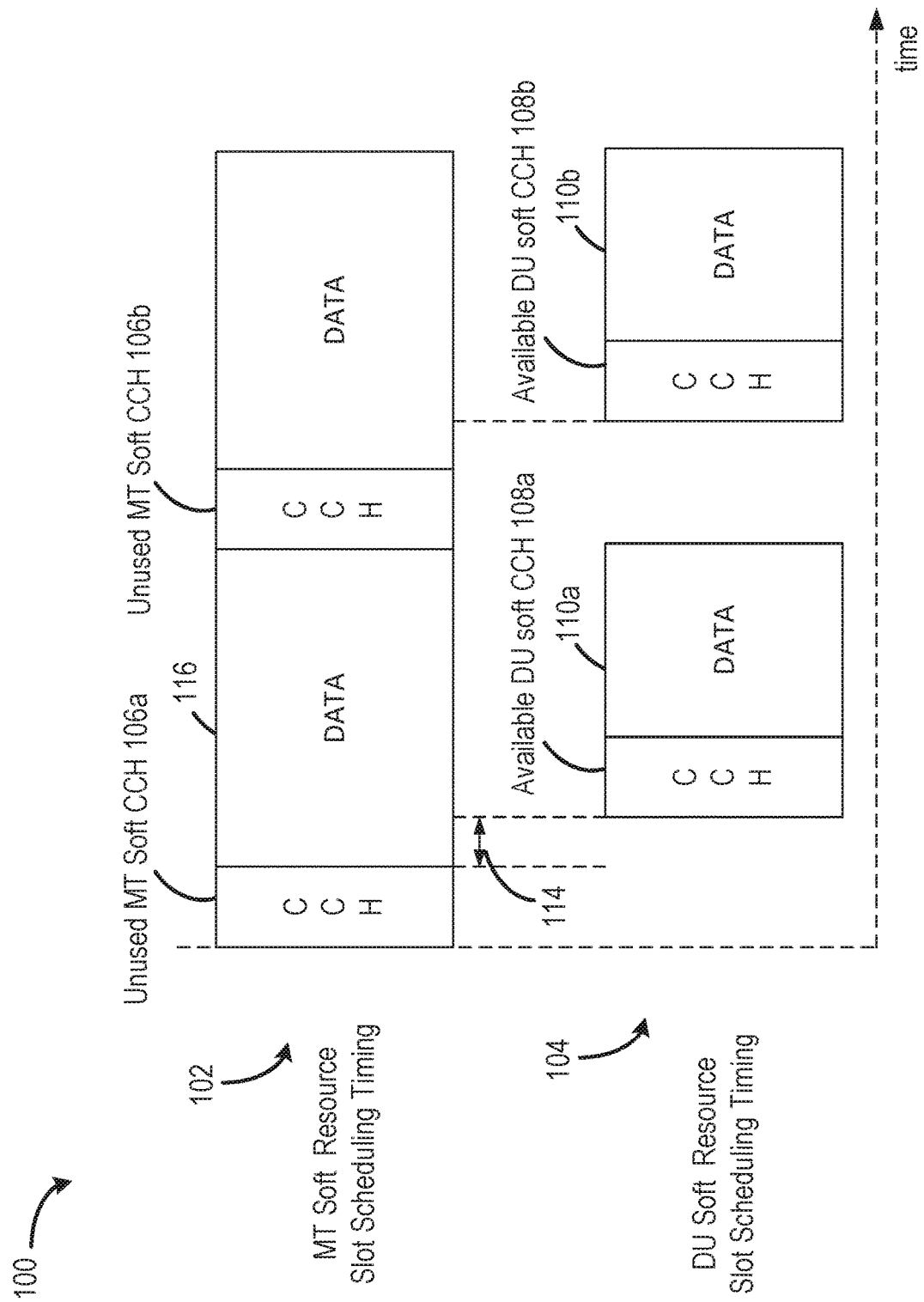
FIG. 1 illustrates an example of IAB DU CCH allocation for soft resource scheduling, according to some implementations of the present disclosure.

The present disclosure is related to Integrated Access and Backhaul (IAB) networks, which is a feature that enables multi-hop routing in cellular networks (e.g., as described in 3GPP Release 16). Generally, IAB networks include an IAB donor (e.g., a base station) that serves a plurality of IAB nodes operating as relays. Additionally, IAB networks implement a central unit-distributed unit (CU-DU) split. In this architecture, IAB nodes terminate the DU and the IAB donor terminates the CU. Further, each IAB node may include a mobile termination (MT) function. An IAB node may communicate with a parent IAB node and/or the IAB donor via the MT (e.g., using a parent link between the MT and the parent node/IAB donor). And the IAB node may communicate with user equipment (UEs) and/or MTs of child IAB nodes via the DU (e.g., using a child link between the DU and the UE or child IAB node). Signaling between MTs of IAB nodes and the CU of the IAB donor may use a Radio Resource Control (RRC) protocol. And signaling between DUs of IAB nodes and the CU of the IAB donor may use an F1-AP protocol. The architecture of IAB networks is explained in greater detail in FIG. 3 (discussed infra).

In IAB networks, time-domain resource allocation has the following properties. Generally, a time-domain resource (e.g., a symbol within a time slot) may be configured as a downlink ("DL" or "D") resource, an uplink ("UL" or "U") resource, or a flexible (F) resource. For instance, the time-domain resources may include a time division duplex (TDD) structure of slots or groups of slots in a radio frame. The configuration of a particular time-domain resource may specify a potential transmission direction of that resource (e.g., DL, UL, or F). From an MT perspective, a parent link may use D/U/F time-domain resources, and from a DU perspective, a child link may use D/U/F time-domain resources. Furthermore, the D/U/F time-domain resources of a DU (e.g., for a child link) may be configured as hard (H), soft (S), or not available (NA). These configurations indicate the resource availability of the configured D/U/F resources as unconditionally available (H), conditionally available (S), or unavailable (NA).

Furthermore, according to 3GPP, a parent IAB node has the ability to know a semi-static DU resource configuration of its child IAB nodes. If the full DU resource configuration information of a child node is not needed, then only the necessary configuration information is signaled to the parent IAB node. As such, an IAB CU (e.g., of an IAB donor) can configure the semi-static resource configuration for the parent IAB DU in a centralized manner. In particular, the resource configuration may include a DU D/U/F configuration and a DU H/S/NA configuration. In some examples, a soft resource can be used by the parent IAB node to make the resource available to the child node, irrespective of the outcome of any implicit determination of availability by the child node. As a result, the parent IAB node does not need to be aware of the outcome of an implicit determination of availability of DU soft resources at a child node.

In some examples, a DU H/S/NA configuration (also referred to as "resource availability") is explicitly indicated per resource type (D/U/F) in each slot of the time-domain resources. However, in such examples, a misalignment in time of the DU and MT resources may occur. In order avoid this potential misalignment (e.g., when determining the validity of H/S/NA at the DU), three approaches are considered. In the first approach, H/S/NA is applied relative to the DU resource configuration slot timing without considering the MT resource configuration or timing. In the second approach, H/S/NA is applied relative to the MT resource configuration slot timing. In the third approach, H is applied relative to the DU resource configuration slot timing, S is implicitly determined by the DU based on whether the corresponding MT configuration indicates the MT resources is F (DU-S), and the remaining resources are assumed to be NA at the child DU.

This disclosure describes methods and systems for applying H/S/NA relative to an MT resource configuration slot timing (i.e., the second approach). The methods and systems enable the CU to obtain information about the required guard symbols for a given DU configuration (if needed). Additionally, the disclosed methods and systems efficiently and dynamically signal available soft resources to a DU so that the DU can correctly determine the available soft resources for data transmission in a child link (e.g., an access link). The dynamic signaling of available soft resources to the DU allows radio resources to be efficiently shared by backhaul and access links. As a result, radio resources can be optimally shared by backhaul and access links according to the respective momentary traffic needs, which is an improvement over existing and conventional solutions.

In a first embodiment, complementary resource availability is signaled between an MT and a DU. In this embodiment, H/S/NA resources in the MT correspond to NA/S/H resources for the DU, respectively. As such, soft MT resources (e.g., D/U/F symbols) may be conditionally available for the DU when they are not used by the MT. In a first implementation of the first embodiment, time shifted allocation of MT and DU control channel resources is signaled. In this implementation, to determine whether soft resources are available for the DU (e.g., to schedule a child link transmission), control channel (CCH) allocations for the DU are allocated one or more symbols after the resources allocated for MT CCH. As such, the detection outcome of the MT CCH can be used to signal the availability of the respective soft resources to the DU.

In a second implementation, a downlink control information (DCI) signaling Go-To-Sleep (GTS) is used to suspend MT CCH monitoring for a number of slots. Once the GTS DCI is received by the MT, the MT stops CCH monitoring in the parent link and indicates to the DU the corresponding available soft resources for the MT GTS duration. A third implementation involves dynamic signaling for reserved resources of the MT parent link. In this implementation, one or more groups of rate matching (RM) pattern groups that include a particular RM resource allocation are configured for MT downlink and/or uplink data transmission. The DCI scheduling DL/UL data transmission can dynamically select one or more configured RM patterns to be rate matched around for the scheduled data transmission in the parent link. The rate matched resources can be indicated as available DU soft resources.

In a second embodiment, DU soft resource determination is determined implicitly. In this embodiment, only hard and non-available resources are configured to the MT. The non-available MT resources are configured as hard resources for DU. Among MT hard resources, some of those always-on MT resources in the parent link, which require MT to continually (or periodically at a rate greater than a threshold) receive or transmit, can be set as non-available DU resources. Other remaining hard resources can be configured as DU soft resources.

In the following discussion, resource availability (e.g., H/S/NA) is explicitly configured per resource type based on transmission direction (e.g., D/U/F) in each slot with respect to MT slot timing. As a result, granularity of resource availability configuration is either on the level of resource type if multiple resource types are configured within the slot, or on the slot level. The following embodiments can be used to determine the IAB-DU resource availability (e.g., H/S/NA).

Complementary Resource Availability between DU and MT

In this embodiment, hard, soft, and non-available resources in the MT correspond to non-available, soft, and hard resources for the DU, respectively. As a result, only those soft MT resources that can be DL, UL, or flexible symbols can be conditionally available for the DU when they are not used for the MT. Within examples, the following dynamic signaling implementations can be used to signal available soft resources to a DU of an IAB node. In the following implementations, it is assumed that the IAB node has established a child link via the DU and a parent link via the MT.

Implementation 1.1: Time Shifted Allocation of MT and DU Control Channels

In a first implementation, to determine whether soft resources are available for the DU (e to schedule a child link transmission), control channel (CCH) allocations for the MT and DU can be configured in such a way that DU CCHs are allocated one or more symbols after the one or more resources allocated for MT CCH.

FIG. 1 illustrates an example 100 of IAB DU CCH allocation for soft resource scheduling, according to some implementations. As shown in FIG. 1, an IAB-MT monitors MT CCH transmissions according to MT soft resource slot scheduling timing 102. If the MT determines that there is no MT CCH transmitted in a current slot (e.g., unused MT soft CCH 106a or unused MT soft CCH 106b), then the corresponding data resources are not to be used by the parent link (e.g., a backhaul link). In this case, the MT indicates available soft slots to the DU, where the available soft resource includes the data resources that are not used by the MT.

After being informed of the available soft resources, the DU can schedule a child link (e.g., access link) traffic through DU CCH allocated in the "DU CCH region." For example, as shown in DU soft resource slot scheduling timing 104, the DU may schedule traffic in available DU soft CCH 108a and/or available DU soft CCH 108b. Child link traffic may then be carried via the scheduled resources (e.g., resources 110a, 110b). As shown in FIG. 1, a gap time 114 is reserved between the end of MT CCH and the start of DU CCH (e.g., between unused MT soft CCH 106a and available DU soft CCH 108a). This gap time accommodates the MT control channel decoding delay and/or potential DU data channel preparation time. As also shown in FIG. 1, due to MT CCH monitoring and the gap time, the DU schedules a shortened slot transmission for the access link (e.g., as compared to a length of an MT data resource, such as resource 116).

Implementation 1.2: MT Go-To-Sleep Downlink Control Signaling Assisted DU Soft Resource Indication In a second implementation, a downlink control information (DCI) signaling go-to-sleep (GTS) can be used to suspend MT CCH monitoring for a specified number of slots. Once the GTS DCI is received by the MT, the MT stops CCH monitoring in the parent link. Then, the MT indicates to the DU the soft resources that correspond to the unmonitored parent link resources as available soft resources. In this case, the DU can schedule the entire soft slot for data transmission (unlike implementation 1.1 where a shortened slot is scheduled).

Figure 2:
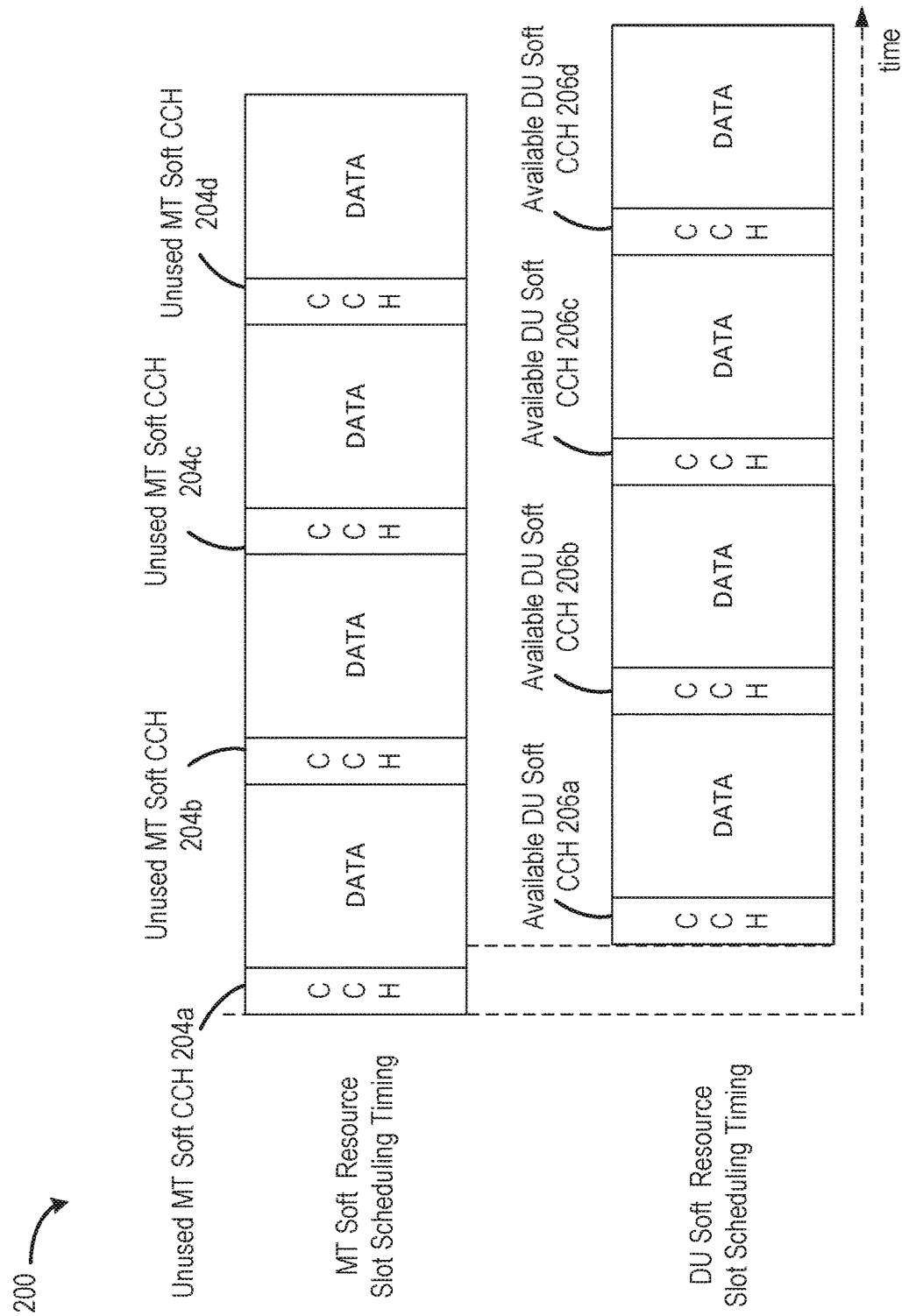
FIG. 2 illustrates an example of MT Go-To-Sleep downlink control signaling assisted DU soft resource indication, according to some implementations of the present disclosure.

FIG. 2 illustrates an example 200 of MT Go-To-Sleep downlink control signaling assisted DU soft resource indication, according to some implementations. In FIG. 2, the MT may receive a DCI GTS that indicates suspension of MT CCH monitoring for four slots. As such, the MT does not schedule data transmissions in the next four slots. For example, in FIG. 2, the MT may not monitor MT CCHs 204a, 204b, 204c, and 204d. These slots are consequently available for DU child link transmission (e.g., access link transmission). Upon the receipt of GTS DCI, the MT informs the DU of the resulting soft resource availability. The DU is now able to schedule child link traffic with these available soft resources. For example, in FIG. 2, the DU may schedule access link traffic in the available DU soft CCH 206a, 206b, 206c, and/or 206d. Moreover, in contrast to the first implementation where a shortened slot is used by the DU, a full soft slot duration is available for DU usage due to the fact that the MT can skip the control channel monitoring during a sleep period.

Implementation 1.3: Dynamic Signaling for Reserved Resources of MT Parent Link

In a third implementation, one or more rate matching (RM) patterns, each including a respective RM resource allocation, can be configured for parent link data transmission. The DCI scheduling the data transmission can dynamically select one or more RM patterns to be rate matched around for the data transmission. The rate matched resources can be used as available DU soft resources.

Figure 3:
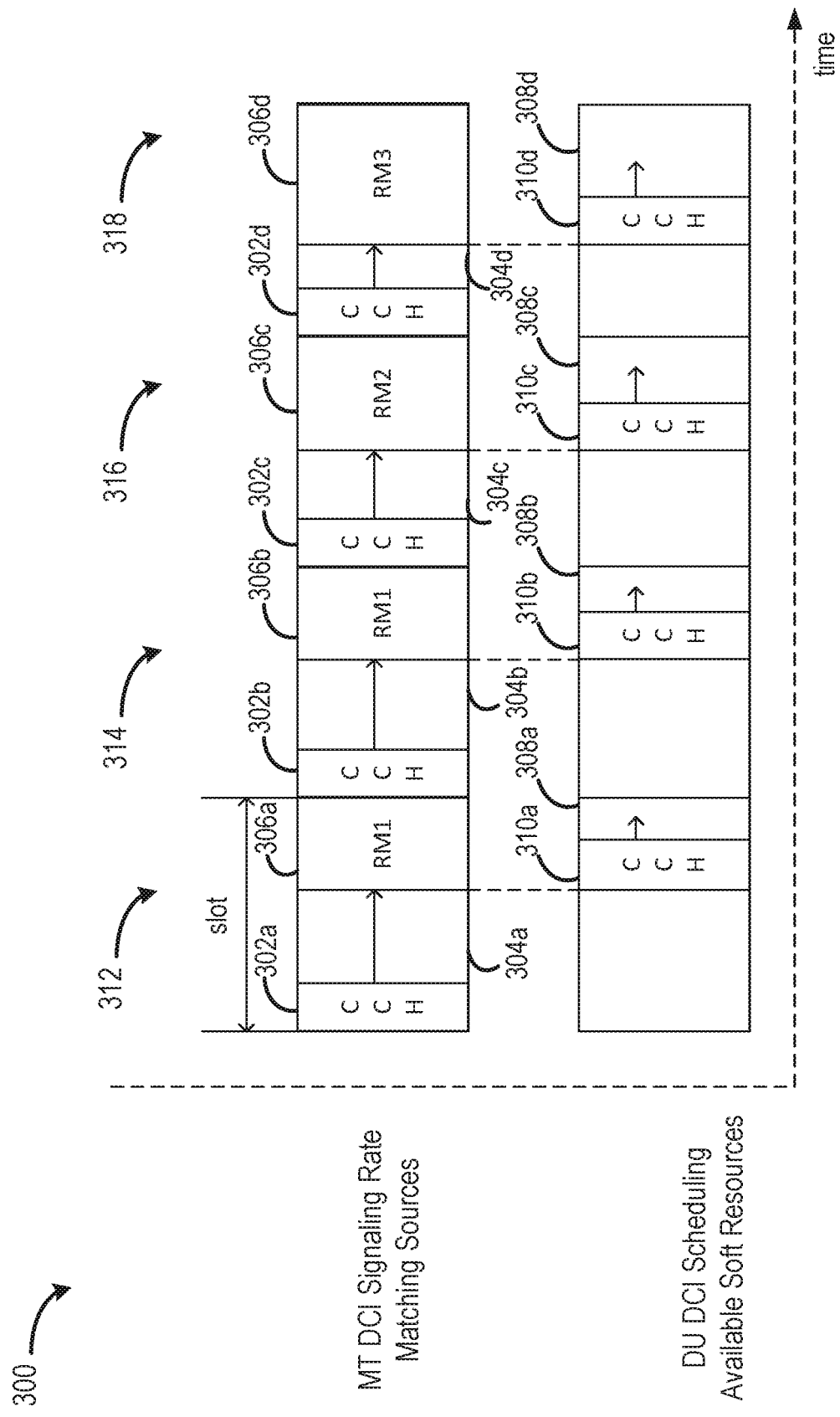
FIG. 3 illustrates an example of dynamic signaling for reserved resources of an MT parent link, according to some implementations of the present disclosure.

FIG. 3 illustrates an example 300 of dynamic signaling for reserved resources of an MT parent link, according to some implementations, As shown in FIG. 3, an MT DCI can signal in a CCH channel an RM pattern for the scheduled parent link data transmission. For example, an MT DCI may schedule in MT CCH 302a an RM pattern for the parent link data transmission. The resource pattern may include an RM resource allocation 304a configured for the parent link data transmission. Additionally, the RM pattern may include a rate matched resource 306a (or "RM1") that can be used as an available DU soft resource. Thus, when the MT receives the DCI signaling the RM pattern, the MT indicates to the DU the corresponding available soft resource to rate matched resource 306a, which is resource 308a. As such, the DU may use the resource 308a for child link data transmissions by scheduling the transmission in the corresponding DU CCH 310a. Similarly, the MT may receive in one or more of MT CCH 302b, 302c, 302d respective DCI indicative of respective RM patterns that include resource allocations 304b, 304c, 304d and rate matched resources 306b, 306c, 306d, respectively. The DU may use resources 308b, 308c, 308d that correspond to the rate matched resources 306b, 306c, 306d, respectively. The DU CCHs 310b, 310c, 310d may schedule the transmissions in resources 308b, 308c, 308d, respectively.

As also shown in FIG. 3, different RM resource patterns can be signaled in different slots of the parent link. For example, in slots 312 and 314 a first RM pattern is scheduled, in slot 316 a second RM pattern is scheduled, and in slot 318 a third RM pattern is scheduled. As shown in FIG. 3, each of the RM patterns may have different lengths. As such, a different amount of soft resources can be available to the DU access link in different slots. To utilize the various amounts of available soft resources, different control channel resource allocations can be configured to the DU according to different RM resource patterns. When the MT receives a DCI signaling an RM pattern, it indicates the corresponding available soft resources to the DU. Then, the DU can employ the associated CCH to schedule the access link data transmission.

Implicit DU Soft Resource Determination

In an embodiment, DU soft resources are determined implicitly. In this embodiment, only hard and non-available resources are configured to the MT, and the non-available MT resources can be configured as hard resources for the DU. Among the MT hard resources, some of those always-on MT resources in the parent link (e.g., Synchronization Signal Block (SSB) resources, channel state information reference signal (CSI-RS), or Sounding Reference Signal (SRS)) and/or control channel resources that require the MT to continuously receive/transmit can be set as non-available DU resources. The remaining hard resources can be configured as DU soft resources.

To determine whether the soft DU resources are available for DU child link transmission or reception, implementations 1.1, 1.2, and 1.3 discussed above can be used to identify the availability of the soft resources.

Figure 4:
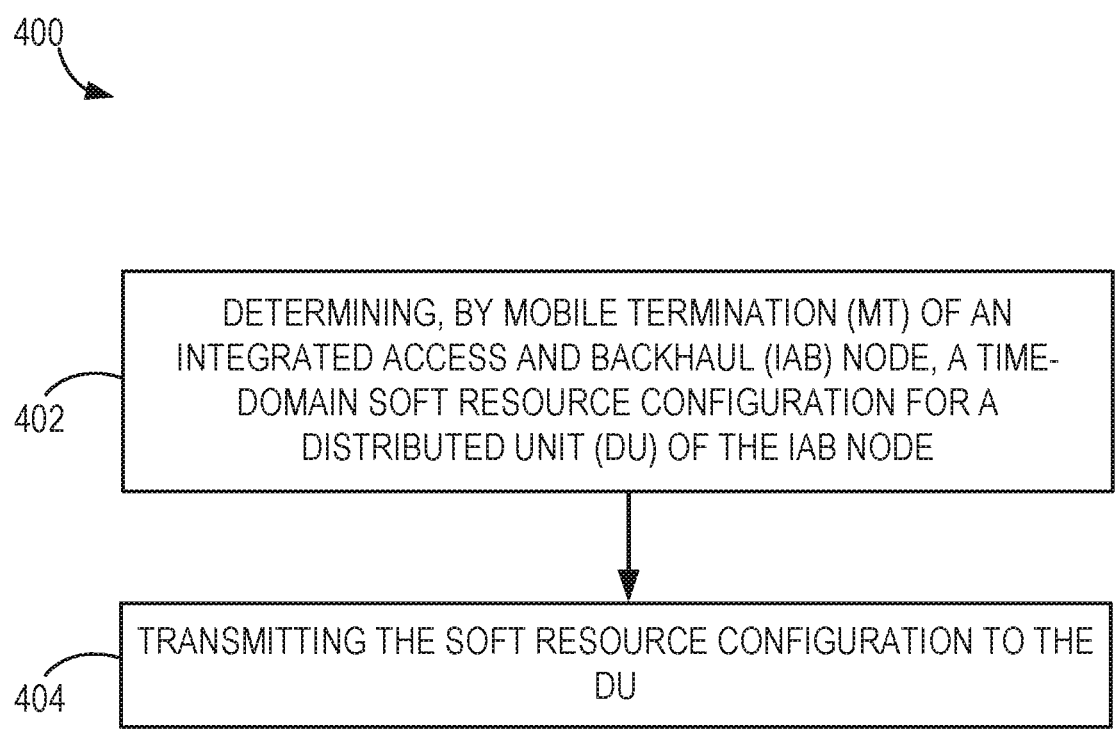
FIG. 4 illustrates a flowchart of an example process, according to some implementations of the present disclosure.
Figure 5:
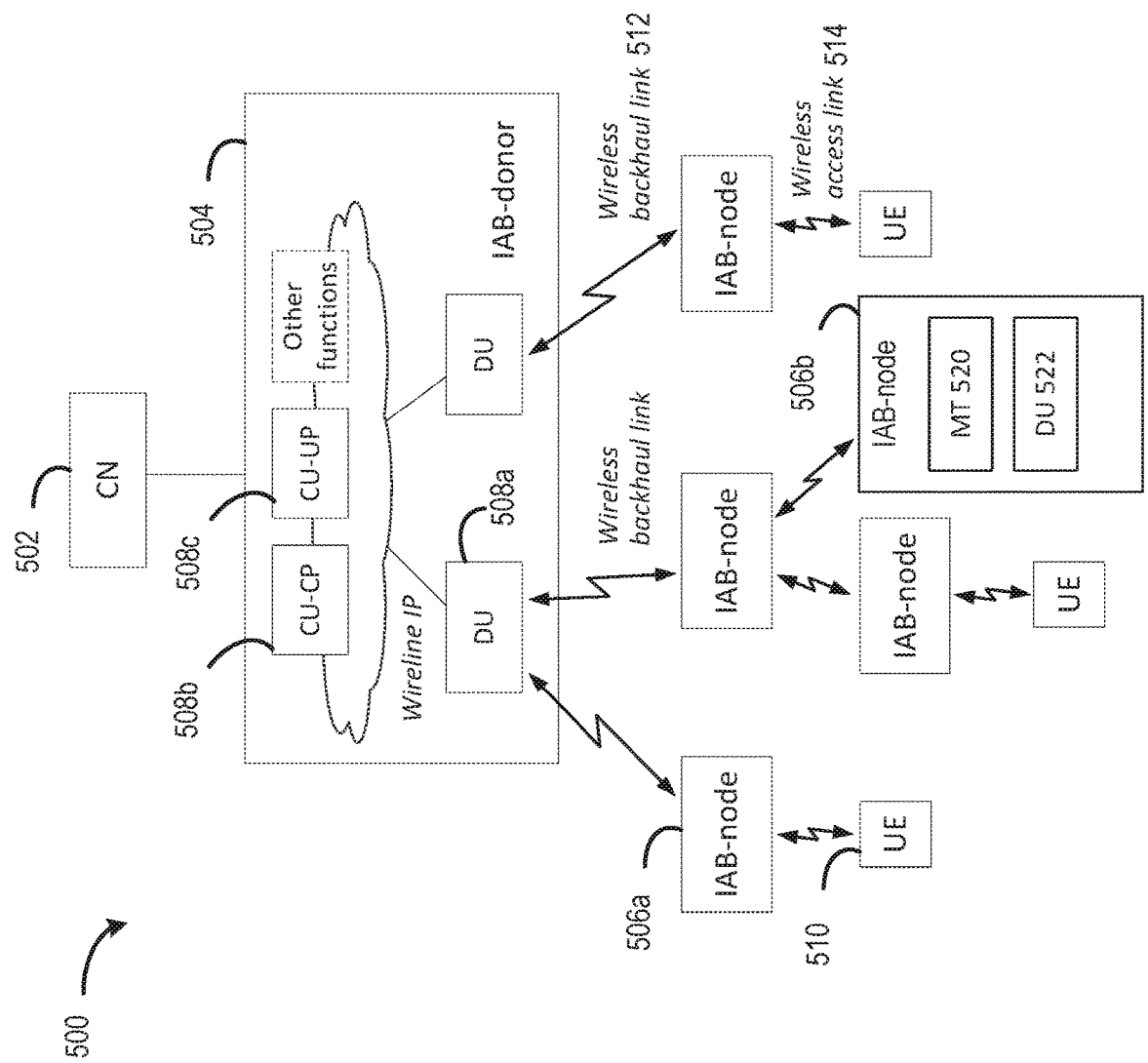
FIG. 5 illustrates an example Integrated Access and Backhaul (IAB) architecture, according to some implementations of the present disclosure

FIG. 4 illustrates a flowchart of an example process 400, according to some implementations. For clarity of presentation, the description that follows generally describes the processes in the context of the other figures in this description. For example, the processes can be performed by an IAB node or an entity thereof (e.g., as shown in FIG. 5). However, it will be understood that the processes may be performed, for example, by any suitable system, environment, software, and hardware, or a combination of systems, environments, software, and hardware, as appropriate. In some implementations, various steps of the processes can be run in parallel, in combination, in loops, or in any order.

FIG. 4 is a flowchart of an example process 400 for determining available soft resources of an IAB node of an IAB system. At step 402, the process involves determining, by a mobile termination (MT) of the IAB node, a time-domain soft resource configuration for a distributed unit (DU) of the IAB node. At step 404, the process involves transmitting the time-domain soft resource configuration to the DU.

In some implementations, control channel (CCH) allocations for the MT and the DU are configured such that a DU CCH is allocated in a symbol after a resource allocated for an MT CCH.

In some implementations, determining, by the MT of the IAB node, the soft resource configuration for the DU of the IAB node includes: determining that the resource allocated for the MT CCH does not include the MT CCH; in response to the determination, determining that a data resource corresponding to the resource allocated for the MT CCH is not used by the MT; and generating the soft resource configuration to indicate an available soft resource for use by the DU, where the available soft resource includes the data resource that is not used by the MT.

In some implementations, upon receipt of the soft resource configuration, the DU is configured to initiate a child link using the DU CCH allocated in a DU CCH region indicated by the soft resource configuration.

In some implementations, a gap time is scheduled between an end of the MT CCH and a start of the DU CCH, where the gap time is a time period to accommodate at least one of an MT CCH decoding delay or a DU data channel preparation time.

In some implementations, determining, by the MT of the IAB node, the soft resource configuration for the DL of the IAB node includes: receiving a go-to-sleep (GTS) downlink control information (DCI); in response to receiving the GTS DCI, suspending MT control channel (CCH) monitoring for a number of slots indicated by the GTS DCI; and indicating available soft resources for the MT GTS duration to the DU.

In some implementations, the suspending comprises not scheduling in slots in the parent link that correspond to the number of slots indicated by the GTS DCI.

In some implementations, determining the configuration includes determining one or more rate matching (RM) patterns, the one or more RM patterns comprising an RM resource allocation for MT data transmissions.

In some implementations, the process further includes: receiving, by the MT, a downlink control information (DCI) scheduling an MT data transmission, wherein the DCI is used to dynamically select one of the one or more RM patterns to be rate matched around for the data transmission.

In some implementations, the process further includes determining, in response to receipt of the DCI, a corresponding available soft resource for the DU, wherein the corresponding available soft resource is a rate matched resource according to the selected RM pattern.

The example process shown in FIG. 4 can be modified or reconfigured to include additional, fewer, or different steps (not shown in the FIG. 4), which can be performed in the order shown or in a different order.

FIG. 5 illustrates an example Integrated Access and Backhaul (IAB) architecture in accordance with various embodiments. In particular, FIG. 5 illustrates IAB architecture in standalone (SA) mode. The IAB architecture of FIG. 5 may use the same infrastructure and spectral resources for both access and backhaul communications. FIG. 5 shows a reference diagram for IAB in standalone mode, which contains one IAB donor 504 (also referred to as an "anchor node" or the like) and multiple IAB nodes, such as IAB-nodes 506a, 506b (also referred to as IAB relay nodes (RNs), relay Transmission/Reception Points (rTRPs), or the like). The IAB donor 504 is treated as a single logical node that comprises a set of functions such as gNB-DU 508a, gNB-CU-CP 508b, gNB-CU-UP 508c, and potentially other functions. In some implementations, the IAB donor 504 can be split according to the aforementioned functions, which can all be either collocated or non-collocated as allowed by 3GPP NG-RAN architecture. Some of the functions presently associated with the IAB donor 504 may be moved outside of the IAB donor.

In FIG. 5, various UEs (e.g., UE 510, UEs 601, 701, and 801 in FIGS. 6, 7, and 8 discussed infra) access IAB nodes. An IAB node is a network node in an IAB deployment having UE and (at least part of) gNB functions. As shown by FIG. 5, some IAB nodes access other IAB nodes, and some IAB nodes access an IAB donor. An IAB donor is a network node in an IAB deployment that terminates NG interfaces via wired connection(s). The IAB donor is a RAN node that provides a UE's interface to a core network 502 (e.g., the 5GC in FIG. 5 and CN 820 in FIG. 8 discussed infra) and wireless backhauling functionality to IAB nodes. An IAB node is a relay node and/or a RAN node that supports wireless access to UEs (e.g., via wireless access link 514) and wirelessly backhaul access traffic.

IAB strives to reuse existing functions and interfaces defined for access. In particular, Mobile-Termination (MT), gNB-DU, gNB-CU, UPF, AMF and SMF as well as the corresponding interfaces NR Uu (between MT and gNB), F1, NG, X2 and N4 are used as baseline for the IAB architectures, Modifications or enhancements to these functions and interfaces for the support of IAB will be explained in the context of the architecture discussion. The Mobile-Termination (MT) function, such as 520, has been defined a component of the Mobile Equipment. In the context of IAB, MT is referred to as a function residing on an IAB node that terminates the radio interface layers of the backhaul Uu interface toward the IAB donor or other IAB nodes. Additional functionality, such as multi-hop forwarding, is included in the architecture.

IAB nodes can operate in SA or in NSA mode. When operating in NSA, the IAB node only uses the NR link for backhauling. The UE (e.g., UE 601 of FIG. 6) connecting to an IAB node may choose a different operation mode than the IAB node. The UE may further connect to a different type of core network than the IAB node it is connected to. In this case, decor or slicing can be used for CN selection. IAB nodes operating in NSA mode may be connected to the same or to different eNBs. UEs that also operate in NSA-node may connect to the same or to a different RAN node (e.g., RAN node 611 of FIG. 6) than the IAB node to which they are connected.

Examples for operation in SA and NSA mode include: (1) the UEs and IAB nodes operate in SA with NGC; (2) UEs operate in NSA with EPC while IAB nodes operates in SA with NGC; and (3) UEs and IAB nodes operate in NSA with EPC. For the third example, the UEs and IAB nodes operate in NSA with EPC (or 5GC for NR implementations), and the IAB node may use the LTE leg (or NR leg for NR implementations) for IAB node initial access and configuration, topology management, route selection, and resource partitioning.

In embodiments where multi-hop and topology adaptation are supported, the IAB nodes include topology management mechanisms and route selection and optimization (RSO) mechanisms. Topology management mechanisms include protocol stacks, interfaces between rTRPs or IAB nodes, control and user plane procedures for identifying one or more hops in the IAB network, forwarding traffic via one or multiple wireless backhaul links (e.g., wireless backhaul 512) in the IAB network, handling of QoS, and the like. The RSO mechanisms include mechanisms for discovery and management of backhaul links for TRPs with integrated backhaul and access functionalities; RAN-based mechanisms to support dynamic route selection (potentially without core network involvement) to accommodate short-term blocking and transmission of latency-sensitive traffic across backhaul links; and mechanisms for evaluating different resource allocations/routes across multiple nodes for end-to-end RSO.

The operation of the different links may be on the same frequencies ("in-band") or different frequencies ("out-of-band"). In-band backhauling includes scenarios where access and backhaul links at least partially overlap in frequency creating half-duplexing or interference constraints, which may imply that an IAB node may not transmit and receive simultaneously on both links. By contrast, out-of-band scenarios may not have such constraints. In embodiments, one or more of the IAB nodes include mechanisms for dynamically allocating resources between backhaul and access links, which include mechanisms to efficiently multiplex access and backhaul links (for both DL and UL directions) in time, frequency, or space under a per-link half-duplex constraint across one or multiple backhaul link hops for both TDD and FDD operation; and cross-link interference (CH) measurement, coordination and mitigation between rTRPs and UEs.

Architecture Groups and Types

There are five different types of IAB architectures that are divided into two architecture groups. Architecture group 1 comprises architectures 1a and 1b, which include CU/DU split architectures. Architecture 1a includes backhauling of F1-U uses an adaptation layer or GTP-U combined with an adaptation layer, and hop-by-hop forwarding across intermediate nodes uses the adaptation layer for operation with NGC or PDN-connection-layer routing for operation with EPC. Architecture 1b includes backhauling of F1-U on access node uses GTP-U/UDP/IP, and hop-by-hop forwarding across intermediate node uses the adaptation layer.

Architecture group 2 comprises architectures 2a, 2b and 2c. Architecture 2a includes backhauling of F1-U or NG-U on access node uses GTP-U/UDP/IP, and hop-by-hop forwarding across intermediate node uses PDU-session-layer routing. Architecture 2b includes backhauling of F1-U or NG-U on access node uses GTP-U/UDP/IP, and hop-by-hop forwarding across intermediate node uses GTP-U/UDP/IP nested tunneling. Architecture 2c includes backhauling of F1-U or NG-U on access node uses GTP-U/UDP/IP, and hop-by-hop forwarding across intermediate node uses GTP-U/UDP/IP/PDCP nested tunneling.

Architecture Group 1

Architecture 1a leverages CU/DU-split architecture. In this architecture, each IAB node holds a DU (e.g., DU 522) and an MT (e.g., MT 520). Via the MT, the IAB node connects to an upstream IAB node or the IAB donor. Via the DU, the IAB node establishes RLC-channels to UEs and to MTs of downstream IAB nodes. For MTs, this RLC-channel may refer to a modified RLC*. An IAB node can connect to more than one upstream IAB node or IAB donor DU. The IAB node may contain multiple DUs, but each DU part of the IAB node has F1-C connection only with one IAB donor CU-CP.

The donor also holds a DU to support UEs and MTs of downstream IAB nodes. The IAB donor holds a CU for the DUs of all IAB nodes and for its own DU. It is FFS if different CUs can serve the DUs of the IAB nodes. Each DU on an IAB node connects to the CU in the IAB donor using a modified form of F1, which is referred to as F1*. F1*-U runs over RLC channels on the wireless backhaul between the MT on the serving IAB node and the DU on the donor. F1*-U transport between MT and DU on the serving IAB node as well as between DU and CU on the donor is FFS. An adaptation layer is added, which holds routing information, enabling hop-by-hop forwarding. It replaces the IP functionality of the standard F1-stack, F1*-U may carry a GTP-U header for the end-to-end association between CU and DU. In a further enhancement, information carried inside the GTP-U header may be included into the adaption layer. Further, optimizations to RLC may be considered such as applying ARCS only on the end-to-end connection opposed to hop-by-hop. The F1*-U protocol stacks for this architecture include enhancements of RLC (referred to as RLC*). The MT of each IAB node further sustains NAS connectivity to the NGC (e.g., for authentication of the IAB node, and sustains a PDU-session via the NGC (e.g., to provide the IAB node with connectivity to the OAM.

For NSA operation with EPC, the MT is dual-connected with the network using EN-DC. The IAB node's MT sustains a PDN connection with the EPC (e.g., to provide the IAB node with connectivity to the OAM.

Architecture 1b also leverages CT/DU-split architecture. In this architecture, the IAB donor only holds one logical CU. An IAB node can connect to more than one upstream IAB node or IAB donor DU. The IAB node may contain multiple DUs, but each DU part of the IAB node has F1-C connection only with one IAB donor CU-CP.

In this architecture, each IAB node and the IAB donor hold the same functions as in architecture 1a. Also, as in architecture 1a, every backhaul link establishes an RLC-channel, and an adaptation layer is inserted to enable hop-by-hop forwarding of F1*.

Opposed to architecture 1a, the MT on each IAB node establishes a PDU-session with a UPF residing on the donor. The MT's PDU-session carries F1* for the collocated DU. In this manner, the PDU-session provides a point-to-point link between CU and DU. On intermediate hops, the PDCP-PDUs of F1* are forwarded via adaptation layer in the same manner as described for architecture 1a.

For NSA operation with EPC, the MT is dual-connected with the network using EN-DC. In this case, the IAB node's MT sustains a PDN connection with a L-GW residing on the donor.

Adaptation Layer: As mentioned previously, an adaptation layer is inserted to enable hop-by-hop forwarding of F1*. In these embodiments, the UE establishes RLC channels to the DU on the UE's access IAB-node in compliance with 3GPP TS 38.300. Each of these RLC-channels is extended via a potentially modified form of F1-U, referred to as F1*-U, between the UE's access DU and the IAB-donor. The information embedded in F1*-U is carried over RLC-channels across the backhaul links. Transport of F1*-U over the wireless backhaul is enabled by an adaptation layer, which is integrated with the RLC channel. Within the IAB-donor (referred to as fronthaul), the baseline is to use native F1-U stack (see section 9 of 3GPP TR 38.874). The IAB-donor DU relays between F1-U on the fronthaul and F1*-U on the wireless backhaul.

In architecture 1a, information carried on the adaptation layer supports the following functions: identification of the UE-bearer for the PDU; routing across the wireless backhaul topology; QoS-enforcement by the scheduler on DL and UL on the wireless backhaul link; mapping of UE user-plane PDUs to backhaul RLC channels; and other suitable functions.

In architecture 1b, information carried on the adaptation layer supports the following functions: routing across the wireless backhaul topology; QoS-enforcement by the scheduler on DL and UL on the wireless backhaul link; mapping of UE user-plane PDUs to backhaul RLC channels; and other suitable functions In case the IAB-node is connected via multiple paths, different identifiers (e.g., UE-bearer-specific UE-specific Id; route Id, IAB-node or IAB-donor address; QoS information, etc.) in the adaptation layer will be associated with the different paths, enabling adaptation layer routing on the different paths. The different paths can be associated with different backhaul RLC-channels.

Content carried on the adaptation layer header may include, for example, UE-bearer-specific Id; UE-specific Id; route Id, IAB-node or IAB-donor address; QoS information; and/or other like information. IAB-nodes use the identifiers carried via Adapt to ensure required QoS treatment and to decide which hop a packet should be sent to. The UE-bearer-specific Id may be used by the IAB-node and the IAB-donor to identify the PDU's UE-bearer. UE's access IAB-node would then map Adapt information (e.g. UE-specific ID, UE-bearer specific ID) into the corresponding C-RNTI and LCID. The IAB-donor DU may also need to map Adapt information into the F1-U GTP-U TEID used between Donor DU and Donor CU. UE-bearer-specific Id, UE-specific Id, Route Id, or IAB-node/IAB-donor address may be used (in combination or individually) to route the PDU across the wireless backhaul topology. UE-bearer-specific Id, UE-specific Id, UE's access node IAB ID, or QoS information may be used (in combination or individually) on each hop to identify the PDU's QoS treatment. The PDU's QoS treatment may also be based on the LCID.

In some embodiments, the adaptation layer may include one or more sublayers, and therefore, the adaptation header may have different structures in different embodiments. For example, the GTP-U header may become a part of the adaptation layer. It is also possible that the GTP-U header is carried on top of the adaptation layer to carry end-to-end association between the IAB-node DU and the CU. Alternatively, an IP header may be part of the adaptation layer or carried on top of the adaptation layer. In one example, the IAB-donor DU holds an IP routing function to extend the IP-routing plane of the fronthaul to the IP-layer carried by adapt on the wireless backhaul. This allows native F1-U to be established e2e (e.g., between IAB-node DUs and IAB-donor CU-UP). The scenario implies that each IAB-node holds an IP-address, which is routable from the fronthaul via the IAB-donor DU. The IAB-nodes' IP addresses may further be used for routing on the wireless backhaul. Note that the IP-layer on top of Adapt does not represent a PDU session. The MT's first hop router on this IP-layer therefore does not have to hold a UPF.

Architecture Group 2

In architecture 2a, UEs and IAB nodes use SA-mode with NGC. In this architecture, the IAB node holds an MT to establish an NR Uu link with a gNB on the parent IAB node or IAB donor. Via this NR-Uu link, the MT sustains a PDU-session with a UPF that is collocated with the gNB. In this manner, an independent PDU-session is created on every backhaul link. Each IAB node further supports a routing function to forward data between PDU-sessions of adjacent links. This creates a forwarding plane across the wireless backhaul. Based on PDU-session type, this forwarding plane supports IP or Ethernet. In case PDU-session type is Ethernet, an IP layer can be established on top. In this manner, each IAB node obtains IP-connectivity to the wireline backhaul network. An IAB node can connect to more than one upstream IAB node or IAB donor.

All IP-based interfaces such as NG, Xn, F1, N4, etc. are carried over this forwarding plane. In the case of F1, the UE-serving IAB node would contain a DU for access links in addition to the gNB and UPF for the backhaul links. The CU for access links would reside in or beyond the IAB Donor. The NG-U protocol stack for IP-based and for Ethernet-based PDU-session type may be used for this architecture.

In case the IAB node holds a DU for UE-access, it may not be required to support PDCP-based protection on each hop since the end user data will already be protected using end to end PDCP between the UE and the CU. Details are FFS.

For NSA operation with EPC, the MT is dual-connected with the network using EN-DC. In this case, the IAB node's MT sustains a PDN-connection with an L-GW residing on the parent IAB node or the IAB donor. All IP-based interfaces such as S1, S5, X2, etc. are carried over this forwarding plane.

In architecture 2b, the IAB node holds an MT to establish an NR Uu link with a gNB on the parent IAB node or IAB donor. Via this NR-Uu link, the MT sustains a PDU-session with a UPF. Opposed to architecture 2a, this UPF is located at the IAB donor. Also, forwarding of PDUs across upstream IAB nodes is accomplished via tunneling. The forwarding across multiple hops therefore creates a stack of nested tunnels. As in architecture 2a, each IAB node obtains IP-connectivity to the wireline backhaul network. All IP-based interfaces such as NG, Xn, F1, N4, etc. are carried over this forwarding IP plane. An IAB node can connect to more than one upstream IAB node or IAB donor.

For NSA operation with EPC, the MT is dual-connected with the network using EN-DC. In this case, the IAB node's MT sustains a PDN-connection with an L-GW residing on the IAB donor.

Architecture 2c leverages DU-CU split. The IAB node holds an MT that sustains an RLC-channel with a DU on the parent IAB node or IAB donor. The IAB donor holds a CU and a UPF for each IAB node's DU. The MT on each IAB node sustains a NR-Uu link with a CU and a PDU session with a UPF on the donor. Forwarding on intermediate nodes is accomplished via tunneling. The forwarding across multiple hops creates a stack of nested tunnels. As in architecture 2a and 2b, each IAB node obtains IP-connectivity to the wireline backhaul network. Opposed to architecture 2b, however, each tunnel includes an SDAP/PDCP layer. All IP-based interfaces such as NG, Xn, F1, N4, etc. are carried over this forwarding plane. An IAB node can connect to more than one upstream IAB node or IAB donor.

For NSA operation with EPC, the MT is dual-connected with the network using EN-DC. In this case, the IAB node's MT sustains a PDN-connection with an L-GW residing on the IAB donor.

Multi-Hop Backhauling

In embodiments, the IAB system architecture supports multi-hoping backhauling. IAB multi-hop backhauling provides more range extension than single hopping systems. Multi-hop backhauling further enables backhauling around obstacles (e.g., buildings in urban environment for in-clutter deployments). The maximum number of hops in a deployment may depend on many factors such as frequency, cell density, propagation environment, traffic load, various KPIs, and/or other like factors. Additionally, the weights assigned to each of these factors may change dynamically over time. With increasing number of hops, scalability issues may arise and limit performance or increase signaling load to unacceptable levels; therefore, scalability to hop-count may be considered as an important KPI for planning and deployment (e.g., SON) purposes. In some implementations, there may be no limits on the number of backhaul hops Topology Adaptation The IAB system architecture also supports topology adaptation. Topology adaptation refers to procedures that autonomously reconfigure the backhaul network under circumstances, such as blockage or local congestion without discontinuing services for UEs and/or to mitigate service disruption for UEs. For example, wireless backhaul links may be vulnerable to blockage due to moving objects such as vehicles, weather-related events (e.g., seasonal changes (foliage)), infrastructure changes (e.g., new buildings), and/or the like. These vulnerabilities may apply to physically stationary IAB nodes and/or mobile IAB nodes. Also, traffic variations can create uneven load distribution on wireless backhaul links leading to local link or node congestion. In various implementations, topology adaptation for physically fixed IAB nodes is supported to enable robust operation to mitigate blockage and load variation on backhaul links.

Physical Layer Enhancements for IAB

The IAB system architecture may also supports the following physical layer features: mechanisms for discovery of IAB-nodes and management of backhaul links in both SA and NSA deployments, taking into account the half-duplex constraint at an IAB-node and multi-hop topologies, including: solutions reusing the same set of SSBs used for access UEs and solutions which use of SSBs which are orthogonal (TDM and/or FDM) with SSBs used for access UEs, CSI-RS-based IAB-node discovery in synchronized deployments, backhaul link RSRP/RSRQ RRM measurements which are SSB-based and CSI-RS based; and enhancements to support configuration of backhaul RACH resources with different occasions, longer RACH periodicities, and additional preamble formats allowing for longer RTT, compared to access RACH resources without impacting Rel-15 UEs; enhancements to Beam Failure Recovery and Radio Link Failure procedures, including solutions to avoid RLF at a child IAB-node due to parent backhaul link failure; mechanisms for supporting both in-band and out-of-band relaying by multiplexing access and backhaul links in time (TDM), frequency (FDM), or space (SDM) under a per-link half-duplex constraint at the IAB-node and across multiple backhaul hops, including: semi-static configuration for IAB-node DU resources, dynamic indication to an IAB-node of the availability of soft resources for an IAB-node DU, and power control/coordination for FDM/SDM of access and backhaul links; OTA timing alignment across multiple backhaul hops, including: mechanisms for DL timing alignment across IAB-nodes, alignment of an IAB-node's UL transmission timing and DL transmission timing, and alignment of an IAB-node's UL reception timing and DL reception timing; inter-IAB-node cross-link interference (CLI) measurements and measurement coordination/configuration; and support of up to 1024 QAM for backhaul links.

IAB-node RACH: IAB supports the ability of network flexibility to configure backhaul RACH resources with different occasions, longer RACH periodicities, and additional preamble formats allowing for longer RTT, compared to access RACH resources without impacting Rel-15 UEs. Based on Rel-15 PRACH configurations, the network is allowed to configure offset(s) for PRACH occasions for the MT of IAB-node(s), in order to TDM backhaul RACH resources across adjacent hops.

Backhaul link management: An IAB-node supports mechanisms for detecting/recovering from backhaul link failure based on Rel-15 mechanisms. Enhancements to Beam Failure Recovery and Radio Link Failure procedures may also include enhancements to support interaction between Beam Failure Recovery success indication and RLF; and enhancements to existing beam management procedures for faster beam switching/coordination/recovery to avoid backhaul link outages should be considered for IAB-nodes. Additional backhaul link condition notification mechanisms (e.g., if the parent IAB-node's backhaul link fails) from the parent IAB-node DU to the child IAB-node, as well as corresponding IAB-node behaviors, may be included.

Figure 6:
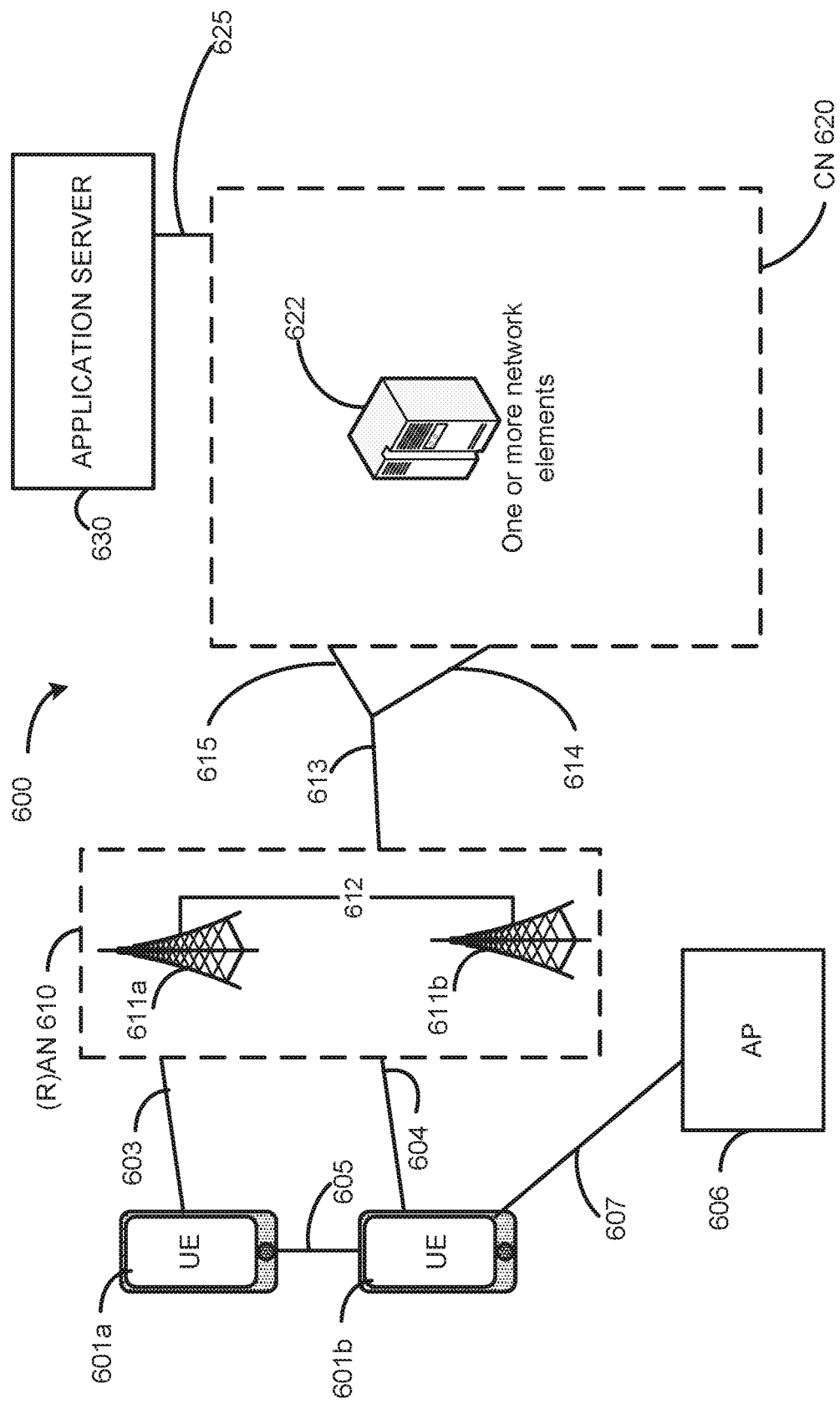
FIG. 6 illustrates an example architecture of a system of a network, according to some implementations of the present disclosure.

FIG. 6 illustrates an example architecture of a system 600 of a network, in accordance with various embodiments. The following description is provided for an example system 600 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 6, the system 600 includes UE 601*a* and UE 601*b* (collectively referred to as "UEs 601" or "UE 601"). In this example, UEs 601 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 601 may be IoT UEs, which may comprise a network access layer designed for low-power IoT applications utilizing short-lived UE connections. An IoT LE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 may be configured to connect, for example, communicatively couple, with an or RAN 610. In embodiments, the RAN 610 may be an NG RAN or a 5G RAN, an E-UTRAN, or a legacy RAN, such as a UTRAN or GERAN. As used herein, the term "NG RAN" or the like may refer to a RAN 610 that operates in an NR or 5G system 600, and the term "E-UTRAN" or the like may refer to a RAN 610 that operates in an LTE or 4G system 600. The UEs 601 utilize connections (or channels) 603 and 604, respectively, each of which comprises a physical communications interface or layer (discussed in further detail below).

In this example, the connections 603 and 604 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 601 may directly exchange communication data via a ProSe interface 605. The ProSe interface 605 may alternatively be referred to as a SL interface 605 and may comprise one or more logical channels, including but not limited to a PSCCH, a PSSCH, a PSDCH, and a PSBCH.

The UE 601b is shown to be configured to access an AP 606 (also referred to as "WLAN node 606," "WLAN 606," "WLAN Termination 606," "WT 606" or the like) via connection 607. The connection 607 can comprise a local wireless connection, such as a connection consistent with any IEEE 802.11 protocol, wherein the AP 606 would comprise a wireless fidelity (Wi-Fi®) router. In this example, the AP 606 is shown to be connected to the Internet without connecting to the core network of the wireless system (described in further detail below). In various embodiments, the UE 601b, RAN 610, and AP 606 may be configured to utilize LWA operation and/or LWIP operation. The LWA operation may involve the UE 601b in RRC_CONNECTED being configured by a RAN node 611a-b to utilize radio resources of LTE and WLAN. LWIP operation may involve the UE 601b using WLAN radio resources (e.g., connection 607) via IPsec protocol tunneling to authenticate and encrypt packets (e.g., IP packets) sent over the connection 607. IPsec tunneling may include encapsulating the entirety of original IP packets and adding a new packet header, thereby protecting the original header of the IP packets.

The RAN 610 can include one or more AN nodes or RAN nodes 611a and 611b (collectively referred to as "RAN nodes 611" or "RAN node 611") that enable the connections 603 and 604. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 611 that operates in an NR or 5G system 600 (for example, a gNB), and the term "E-UTRAN node" or the like may refer to a RAN node 611 that operates in an LTE or 4G system 600 (e.g., an eNB). According to various embodiments, the RAN nodes 611 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 611 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 611; a MAC/PHY split wherein RRC, PDCP, RLC, and MAC layers are operated by the CRAN/vBBUP and the PHY layer is operated by individual RAN nodes 611; or a "lower PHY" split wherein RRC, PDCP, RLC, MAC layers and upper portions of the PHY layer are operated by the CRAN/vBBUP and lower portions of the PHY layer are operated by individual RAN nodes 611. This virtualized framework allows the freed-up processor cores of the RAN nodes 611 to perform other virtualized applications. In some implementations, an individual RAN node 611 may represent individual gNB-DUs that are connected to a gNB-CU via individual F1 interfaces (not shown by FIG. 6). In these implementations, the gNB-DUs may include one or more remote radio heads or RFEMs (see, e.g., FIG. 9), and the gNB-CU may be operated by a server that is located in the RAN 610 (not shown) or by a server pool in a similar manner as the CRAN/vBBUP. Additionally or alternatively, one or more of the RAN nodes 611 may be next generation eNBs (ng-eNBs), which are RAN nodes that provide E-UTRA user plane and control plane protocol terminations toward the UEs 601, and are connected to a 5GC (e.g., CN 820 of FIG. 8) via an NG interface (discussed infra).

In V2X scenarios one or more of the RAN nodes 611 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 601 (vUEs 601). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 611 can terminate the air interface protocol and can be the first point of contact for the UEs 601. In some embodiments, any of the RAN nodes 611 can fulfill various logical functions for the RAN 610 including, but not limited to, radio network controller (RNC) functions such as radio bearer management, uplink and downlink dynamic radio resource management and data packet scheduling, and mobility management.

In embodiments, the UEs 601 can be configured to communicate using OFDM communication signals with each other or with any of the RAN nodes 611 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 to the UEs 601, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 601 and the RAN nodes 611 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 601 and the RAN nodes 611 may operate using LAA, eLAA, and/or feLAA mechanisms. In these implementations, the UEs 601 and the RAN nodes 611 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 601 RAN nodes 611, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 601, AP 606, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PUSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 601 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 601. The PDCCH carries information about the transport format and resource allocations related to the PDSCH channel, among other things. It may also inform the UEs 601 about the transport format, resource allocation, and HARQ information related to the uplink shared channel. Typically, downlink scheduling (assigning control and shared channel resource blocks to the UE 601b within a cell) may be performed at any of the RAN nodes 611 based on channel quality information fed back from any of the UEs 601. The downlink resource assignment information may be sent on the PDCCH used for (e.g., assigned to) each of the UEs 601.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 611 may be configured to communicate with one another via interface 612. In embodiments where the system 600 is an UE system (e.g., when CN 620 is an EPC 720 as in FIG. 7), the interface 612 may be an X2 interface 612. The X2 interface may be defined between two or more RAN nodes 611 (e.g., two or more eNBs and the like) that connect to EPC 620, and/or between two eNBs connecting to EPC 620. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a LE 601 from an SeNB for user data; information of PDCP PDUs that were not delivered to a UE 601; information about a current minimum desired buffer size at the SeNB for transmitting to the LE user data; and the like. The X2-C may provide intra-LTE access mobility functionality, including context transfers from source to target eNBs, user plane transport control, etc.; load management functionality; as well as inter-cell interference coordination functionality.

In embodiments where the system 600 is a 5G or NR system (e.g., when CN 620 is an 5GC 820 as in FIG. 8), the interface 612 may be an Xn interface 612. The Xn interface is defined between two or more RAN nodes 611 (e.g., two or more gNBs and the like) that connect to 5GC 620, between a RAN node 611 (e.g., a gNB) connecting to 5GC 620 and an eNB, and/or between two eNBs connecting to 5GC 620. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the interface; mobility support for UE 601 in a connected mode (e.g., CM-CONNECTED) including functionality to manage the UE mobility for connected mode between one or more RAN nodes 611. The mobility support may include context transfer from an old (source) serving RAN node 611 to new (target) serving RAN node 611; and control of user plane tunnels between old (source) serving RAN node 611 to new (target) serving RAN node 611. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 610 is shown to be communicatively coupled to a core network-in this embodiment, core network (CN) 620. The CN 620 may comprise a plurality of network elements 622, which are configured to offer various data and telecommunications services to customers/subscribers (e.g., users of UEs 601) who are connected to the CN 620 via the RAN 610. The components of the CN 620 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 620 may be referred to as a network slice, and a logical instantiation of a portion of the CN 620 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 630 may be an element offering applications that use IP bearer resources with the core network (e.g., UMTS PS domain, LTE PS data services, etc.). The application server 630 can also be configured to support one or more communication services (e.g., VoIP sessions, PTT sessions, group communication sessions, social networking services, etc.) for the UEs 601 via the EPC 620.

In embodiments, the CN 620 may be a 5GC (referred to as "5GC 620" or the like), and the RAN 610 may be connected with the CN 620 via an NG interface 613. In embodiments, the NG interface 613 may be split into two parts, an NG user plane (NG-U) interface 614, which carries traffic data between the RAN nodes 611 and a UPF, and the S1 control plane (NG-C) interface 615, which is a signaling interface between the RAN nodes 611 and AMFs. Embodiments where the CN 620 is a 5GC 620 are discussed in more detail with regard to FIG. 8.

In embodiments, the CN 620 may be a 5G CN (referred to as "5GC 620" or the like), while in other embodiments, the CN 620 may be an EPC). Where CN 620 is an EPC (referred to as "EPC 620" or the like), the RAN 610 may be connected with the CN 620 via an S1 interface 613. In embodiments, the S1 interface 613 may be split into two parts, an S1 user plane (S1-U) interface 614, which carries traffic data between the RAN nodes 611 and the S-GW, and the S1-MME interface 615, which is a signaling interface between the RAN nodes 611 and MMEs.

Figure 7:
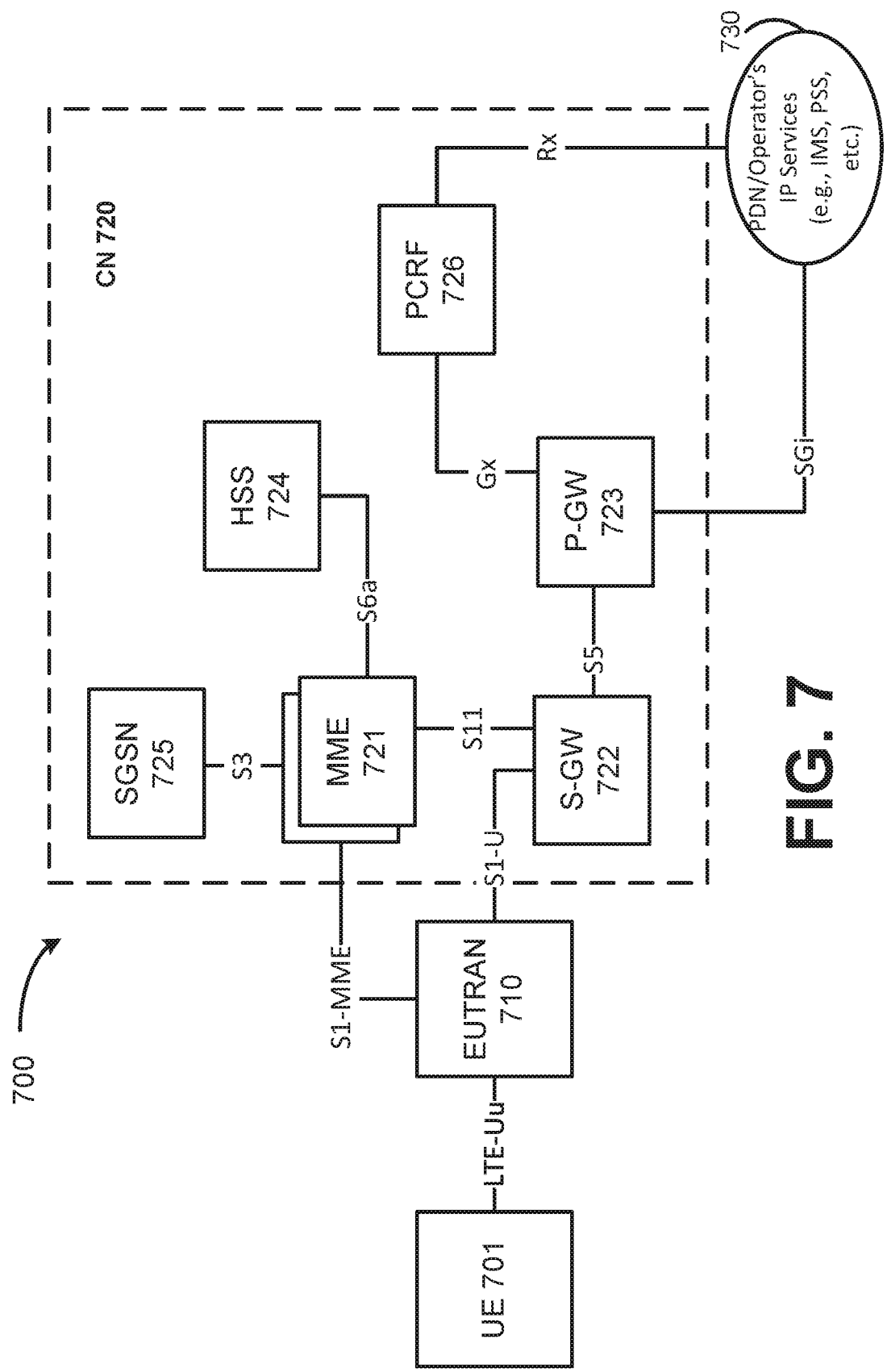
FIG. 7 illustrates an example architecture of a system including a first CN, according to some implementations of the present disclosure.

FIG. 7 illustrates an example architecture of a system 700 including a first CN 720, in accordance with various embodiments. In this example, system 700 may implement the UE standard wherein the CN 720 is an EPC 720 that corresponds with CN 620 of FIG. 6. Additionally, the UE 701 may be the same or similar as the UEs 601 of FIG. 6, and the E-UTRAN 710 may be a RAN that is the same or similar to the RAN 610 of FIG. 6, and which may include RAN nodes 611 discussed previously. The CN 720 may comprise MMEs 721, an S-GW 722, a P-GW 723, a HSS 724, and a SGSN 725.

The MMEs 721 may be similar in function to the control plane of legacy SGSN, and may implement MM functions to keep track of the current location of a UE 701. The MMEs 721 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 701, provide user identity confidentiality, and/or perform other like services to users/subscribers. Each UE 701 and the MME 721 may include an MM or EMM sublayer, and an MM context may be established in the UE 701 and the MME 721 when an attach procedure is successfully completed. The MM context may be a data structure or database object that stores MM-related information of the UE 701. The MMEs 721 may be coupled with the HSS 724 via an S6a reference point, coupled with the SGSN 725 via an S3 reference point, and coupled with the S-GW 722 via an S11 reference point.

The SGSN 725 may be a node that serves the UE 701 by tracking the location of an individual UE 701 and performing security functions. In addition, the SGSN 725 may perform Inter-EPC node signaling for mobility between 2G/3G and E-UTRAN 3GPP access networks; PDN and S-GW selection as specified by the MMEs 721; handling of UE 701 time zone functions as specified by the MMEs 721; and MME selection for handovers to E-UTRAN 3GPP access network. The S3 reference point between the MMEs 721 and the SGSN 725 may enable user and bearer information exchange for inter-3GPP access network mobility in idle and/or active states.

The HSS 724 may comprise a database for network users, including subscription-related information to support the network entities' handling of communication sessions. The EPC 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc. An S6a reference point between the HSS 724 and the MMEs 721 may enable transfer of subscription and authentication data for authenticating/authorizing user access to the EPC 720 between HSS 724 and the MMEs 721.

The S-GW 722 may terminate the S1 interface 613 ("S1-U" in FIG. 7) toward the RAN 710, and routes data packets between the RAN 710 and the EPC 720. In addition, the S-GW 722 may be a local mobility anchor point for inter-RAN node handovers and also may provide an anchor for inter-3GPP mobility. Other responsibilities may include lawful intercept, charging, and some policy enforcement. The S11 reference point between the S-GW 722 and the MMEs 721 may provide a control plane between the MMEs 721 and the S-GW 722. The S-GW 722 may be coupled with the P-GW 723 via an S5 reference point.

The P-GW 723 may terminate an SGi interface toward a PDN 730. The P-GW 723 may route data packets between the EPC 720 and external networks such as a network including the application server 630 (alternatively referred to as an "AF") via an IP interface 625 (see e.g., FIG. 6). In embodiments, the P-GW 723 may be communicatively coupled to an application server (application server 630 of FIG. 6 or PDN 730 in FIG. 7) via an IP communications interface 625 (see, e.g., FIG. 6). The S5 reference point between the P-GW 723 and the S-GW 722 may provide user plane tunneling and tunnel management between the P-GW 723 and the S-GW 722. The S5 reference point may also be used for S-GW 722 relocation due to UE 701 mobility and if the S-GW 722 needs to connect to a non-collocated P-GW 723 for the required PDN connectivity. The P-GW 723 may further include a node for policy enforcement and charging data collection (e.g., PCEF (not shown)). Additionally, the SGi reference point between the P-GW 723 and the packet data network (PDN) 730 may be an operator external public, a private PDN, or an intra operator packet data network, for example, for provision of IMS services. The P-GW 723 may be coupled with a PCRF 726 via a Gx reference point.

PCRF 726 is the policy and charging control element of the EPC 720. In a non-roaming scenario, there may be a single PCRF 726 in the Home Public Land Mobile Network (HPLMN) associated with a UE 701's Internet Protocol Connectivity Access Network (IP-CAN) session. In a roaming scenario with local breakout of traffic, there may be two PCRFs associated with a UE 701's IP-CAN session, a Home PCRF (H-PCRF) within an HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate QoS and charging parameters. The PCRF 726 may provision this rule into a PCEF (not shown) with the appropriate TFT and QCI, which commences the QoS and charging as specified by the application server 730. The Gx reference point between the PCRF 726 and the P-GW 723 may allow for the transfer of QoS policy and charging rules from the PCRF 726 to PCEF in the P-GW 723. An Rx reference point may reside between the PDN 730 (or "AF 730") and the PCRF 726.

Figure 8:
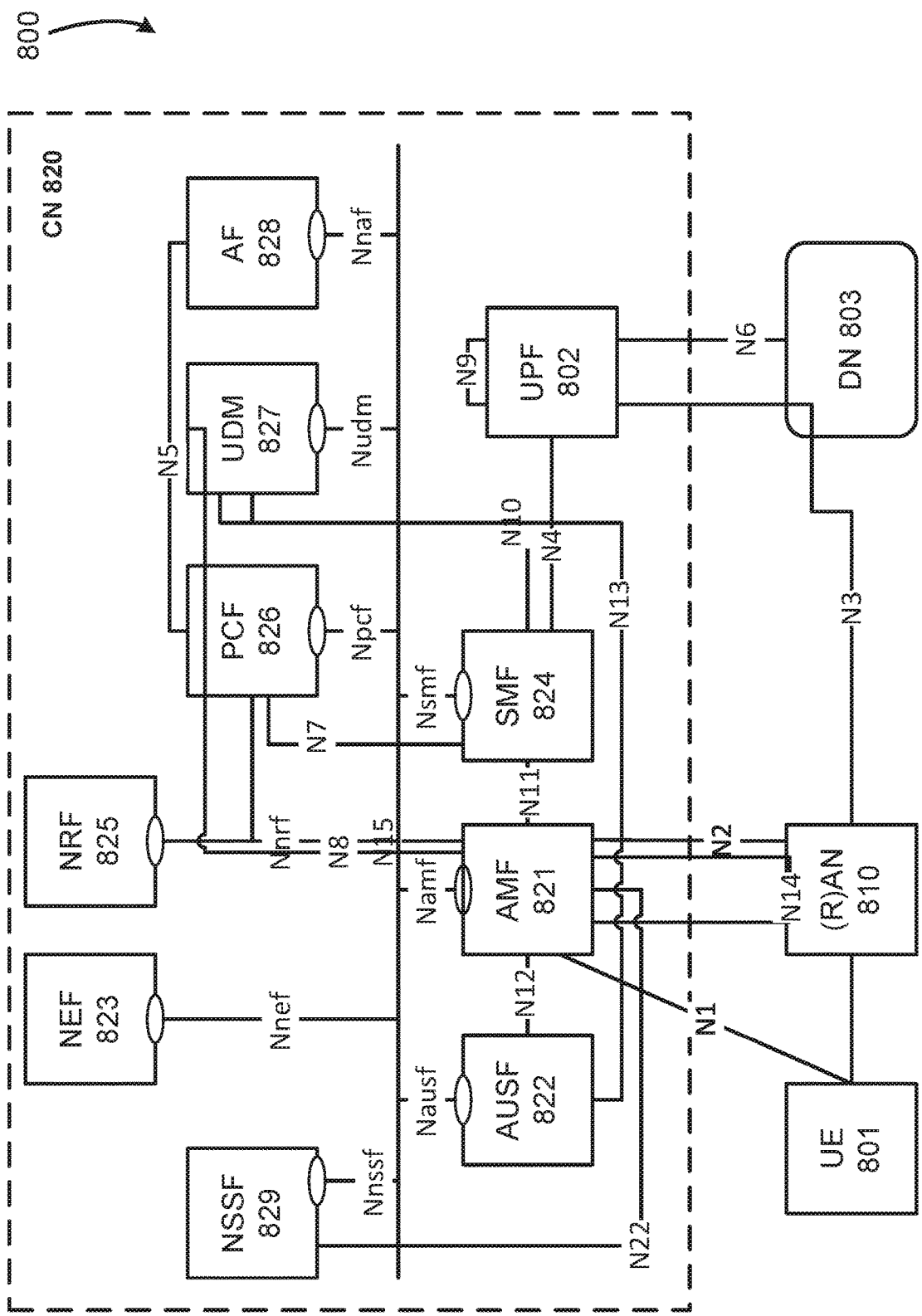
FIG. 8 illustrates an architecture of a system including a second CN, according to some implementations of the present disclosure.

FIG. 8 illustrates an architecture of a system 800 including a second CN 820 in accordance with various embodiments. The system 800 is shown to include a UE 801, which may be the same or similar to the UEs 601 and UE 701 discussed previously; a (R)AN 810, which may be the same or similar to the RAN 610 and RAN 710 discussed previously, and which may include RAN nodes 611 discussed previously; and a DN 803, which may be, for example, operator services. Internet access or 3rd party services; and a 5GC 820. The 5GC 820 may include an AUSF 822; an AMF 821; a SMF 824; a NEF 823; a PCF 826; a NRF 825; a UDM 827; an AF 828; a UPF 802; and a NSSF 829.

The UPF 802 may act as an anchor point for intra-RAT and inter-RAT mobility, an external PDU session point of interconnect to DN 803, and a branching point to support multi-homed PDU session. The UPF 802 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 802 may include an uplink classifier to support routing traffic flows to a data network. The DN 803 may represent various network operator services. Internet access, or third party services. DN 803 may include, or be similar to, application server 630 discussed previously. The UPF 802 may interact with the SMF 824 via an N4 reference point between the SMF 824 and the UPF 802.

The AUSF 822 may store data for authentication of UE 801 and handle authentication-related functionality. The AUSF 822 may facilitate a common authentication framework for various access types. The AUSF 822 may communicate with the AMF 821 via an N12 reference point between the AMF 821 and the AUSF 822; and may communicate with the UDM 827 via an N13 reference point between the UDM 827 and the AUSF 822. Additionally, the AUSF 822 may exhibit an Nausf service-based interface.

The AMF 821 may be responsible for registration management (e.g., for registering UE 801, etc.), connection management, reachability management, mobility management, and lawful interception of AMF-related events, and access authentication and authorization. The AMF 821 may be a termination point for the an N11 reference point between the AMF 821 and the SMF 824. The AMF 821 may provide transport for SM messages between the UE 801 and the SMF 824, and act as a transparent proxy for routing SM messages. AMF 821 may also provide transport for SMS messages between UE 801 and an SMSF (not shown by FIG. 8). AMF 821 may act as SEAF, which may include interaction with the AUSF 822 and the UE 801, receipt of an intermediate key that was established as a result of the UE 801 authentication process. Where USIM based authentication is used, the AMF 821 may retrieve the security material from the AUSF 822. AMF 821 may also include a SCM function, which receives a key from the SEA that it uses to derive access-network specific keys. Furthermore, AMF 821 may be a termination point of a RAN CP interface, which may include or be an N2 reference point between the (R)AN 810 and the AMF 821; and the AMF 821 may be a termination point of NAS (N1) signalling, and perform NAS ciphering and integrity protection.

AMF 821 may also support NAS signalling with a UE 801 over an N3 IWF interface. The N3IWF may be used to provide access to entrusted entities. N3IWF may be a termination point for the N2 interface between the (R)AN 810 and the AMF 821 for the control plane, and may be a termination point for the N3 reference point between the (R)AN 810 and the LW 802 for the user plane. As such, the AMF 821 may handle N2 signalling from the SMF 824 and the AMF 821 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 801 and AMF 821 via an N1 reference point between the UE 801 and the AMF 821, and relay uplink and downlink user-plane packets between the UE 801 and UPF 802. The N3IWF also provides mechanisms for IPsec tunnel establishment with the UE 801. The AMF 821 may exhibit an Namf service-based interface, and may be a termination point for an N14 reference point between two AMFs 821 and an N17 reference point between the AMF 821 and a 5G-EIR (not shown by FIG. 8).

The UE 801 may need to register with the AMF 821 in order to receive network services. RM is used to register or deregister the UE 801 with the network (e.g., AMF 821), and establish a UE context in the network (e.g., AMF 821). The UE 801 may operate in an RM-REGISTERED state or an RM-DEREGISTERED state. In the RM DEREGISTERED state, the UE 801 is not registered with the network, and the UE context in AMF 821 holds no valid location or routing information for the UE 801 so the UE 801 is not reachable by the AMF 821. In the RM REGISTERED state, the UE 801 is registered with the network, and the UE context in AMF 821 may hold a valid location or routing information for the UE 801 so the UE 801 is reachable by the AMF 821. In the RM-REGISTERED state, the UE 801 may perform mobility Registration Update procedures, perform periodic Registration Update procedures triggered by expiration of the periodic update timer (e.g., to notify the network that the UE 801 is still active), and perform a Registration Update procedure to update UE capability information or to re-negotiate protocol parameters with the network, among others.

The AMF 821 may store one or more RM contexts for the UE 801, where each RM context is associated with a specific access to the network. The RM context may be a data structure, database object, etc. that indicates or stores, inter alia, a registration state per access type and the periodic update timer. The AMF 821 may also store a 5GC MM context that may be the same or similar to the (E)MM context discussed previously. In various embodiments, the AMF 821 may store a CE mode B Restriction parameter of the UE 801 in an associated MM context or RM context. The AMF 821 may also derive the value, when needed, from the UE's usage setting parameter already stored in the UE context (and/or MM/RM context).

CM may be used to establish and release a signaling connection between the UE 801 and the AMF 821 over the N1 interface. The signaling connection is used to enable NAS signaling exchange between the UE 801 and the CN 820, and comprises both the signaling connection between the UE and the AN (e.g., RRC connection or UE-N3IWF connection for non-3GPP access) and the N2 connection for the UE 801 between the AN (e.g., RAN 810) and the AMP 821. The UE 801 may operate in one of two CM states, CM-IDLE mode or CM-CONNECTED mode. When the UE 801 is operating in the CM-IDLE state/mode, the UE 801 may have no NAS signaling connection established with the AMF 821 over the N1 interface, and there may be (R)AN 810 signaling connection (e.g., N2 and/or N3 connections) for the UE 801. When the UE 801 is operating in the CM-CONNECTED state/mode, the UE 801 may have an established NAS signaling connection with the AMP 821 over the N1 interface, and there may be a (R)AN 810 signaling connection (e.g., N2 and/or N3 connections) for the UE 801. Establishment of an N2 connection between the (R)AN 810 and the AMF 821 may cause the UE 801 to transition from CM-IDLE mode to CM-CONNECTED mode, and the UE 801 may transition from the CM-CONNECTED mode to the CM-IDLE mode when N2 signaling between the (R)AN 810 and the AMP 821 is released.

The SMF 824 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 801 and a data network (DN) 803 identified by a Data Network Name (DNN). PDU sessions may be established upon UE 801 request, modified upon UE 801 and 5GC 820 request, and released upon UE 801 and 5GC 820 request using NAS SM signaling exchanged over the N1 reference point between the UE 801 and the SMF 824. Upon request from an application server, the 5GC 820 may trigger a specific application in the UE 801. In response to receipt of the trigger message, the UE 801 may pass the trigger message (or relevant parts/information of the trigger message) to one or more identified applications in the UE 801. The identified application(s) in the UE 801 may establish a PDU session to a specific DNN. The SMF 824 may check whether the UE 801 requests are compliant with user subscription information associated with the UE 801. In this regard, the SMF 824 may retrieve and/or request to receive update notifications on SMF 824 level subscription data from the UDM 827.

The SMF 824 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 824 may be included in the system 800, which may be between another SMF 824 in a visited network and the SMF 824 in the home network in roaming scenarios. Additionally, the SMF 824 may exhibit the Nsmf service-based interface.

The NEF 823 may provide means for securely exposing the services and capabilities provided by 3GPP network functions for third party, internal exposure/re-exposure, Application Functions (e.g., AF 828), edge computing or fog computing systems, etc. In such embodiments, the NEF 823 may authenticate, authorize, and/or throttle the AFs. NEF 823 may also translate information exchanged with the AF 828 and information exchanged with internal network functions. For example, the NEF 823 may translate between an AF-Service-Identifier and an internal 5GC information. NEF 823 may also receive information from other network functions (NFs) based on exposed capabilities of other network functions. This information may be stored at the NEF 823 as structured data, or at a data storage NF using standardized interfaces. The stored information can then be re-exposed by the NEF 823 to other NFs and AFs, and/or used for other purposes such as analytics. Additionally, the NEF 823 may exhibit an Nnef service-based interface.

The NRF 825 may support service discovery functions, receive NF discovery requests from NF instances, and provide the information of the discovered NF instances to the NF instances. NRF 825 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 825 may exhibit the Nnrf service-based interface.

The PCF 826 may provide policy rules to control plane function(s) to enforce them, and may also support unified policy framework to govern network behaviour. The PCF 826 may also implement an FE to access subscription information relevant for policy decisions in a UDR of the UDM 827. The PCF 826 may communicate with the AMF 821 via an N15 reference point between the PCF 826 and the AMF 821, which may include a PCF 826 in a visited network and the AMF 821 in case of roaming scenarios. The PCF 826 may communicate with the AF 828 via an N5 reference point between the PCF 826 and the AF 828; and with the SMF 824 via an N7 reference point between the PCF 826 and the SMF 824. The system 800 and/or CN 820 may also include an N24 reference point between the PCF 826 (in the home network) and a PCF 826 in a visited network. Additionally, the PCF 826 may exhibit an Npcf service-based interface.

The UDM 827 may handle subscription-related information to support the network entities' handling of communication sessions, and may store subscription data of UE 801. For example, subscription data may be communicated between the UDM 827 and the AMF 821 via an N8 reference point between the UDM 827 and the AMF. The UDM 827 may include two parts, an application FE and a UDR (the FE and UDR are not shown by FIG. 8). The UDR may store subscription data and policy data for the UDM 827 and the PCF 826, and/or structured data for exposure and application data (including PFDs for application detection, application request information for multiple UEs 801) for the NEF 823. The Nudr service-based interface may be exhibited by the UDR 221 to allow the UDM 827, PCF 826, and NEF 823 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 824 via an N10 reference point between the UDM 827 and the SMF 824, UDM 827 may also support SMS management, wherein an SMS-FE implements the similar application logic as discussed previously. Additionally, the UDM 827 may exhibit the Nudm service-based interface.

The AF 828 may provide application influence on traffic routing, provide access to the NCE, and interact with the policy framework for policy control. The NCE may be a mechanism that allows the 5GC 820 and AF 828 to provide information to each other via. NEF 823, which may be used for edge computing implementations. In such implementations, the network operator and third party services may be hosted close to the UE 801 access point of attachment to achieve an efficient service delivery through the reduced end-to-end latency and load on the transport network. For edge computing implementations, the 5GC may select a UPF 802 close to the UE 801 and execute traffic steering from the LW 802 to DN 803 via the N6 interface. This may be based on the UE subscription data, HE location, and information provided by the AF 828. In this way, the AF 828 may influence UPF (re)selection and traffic routing. Based on operator deployment, when AF 828 is considered to be a trusted entity, the network operator may permit AF 828 to interact directly with relevant NFs. Additionally, the AF 828 may exhibit an Naf service-based interface.

The NSSF 829 may select a set of network slice instances serving the UE 801. The NSSF 829 may also determine allowed NSSAI and the mapping to the subscribed S-NS-SAIs, if needed. The NSSF 829 may also determine the AMF set to be used to serve the UE 801, or a list of candidate AMF(s) 821 based on a suitable configuration and possibly by querying the NRF 825. The selection of a set of network slice instances for the UE 801 may be triggered by the AMF 821 with which the UE 801 is registered by interacting with the NSSF 829, which may lead to a change of AMF 821. The NSSF 829 may interact with the AMF 821 via an N22 reference point between AMF 821 and NSSF 829; and may communicate with another NSSF 829 in a visited network via an N31 reference point (not shown by FIG. 8). Additionally, the NSSF 829 may exhibit an Nnssf service-based interface.

As discussed previously, the CN 820 may include an SMSF, which may be responsible for SMS subscription checking and verification, and relaying SM messages to/from the UE 801 to/from other entities, such as an SMS-GMSC/IWMSC/SMS-router. The SMS may also interact with AMF 821 and UDM 827 for a notification procedure that the UE 801 is available for SMS transfer (e.g., set a UE not reachable flag, and notifying UDM 827 when UE 801 is available for SMS).

The CN 120 may also include other elements that are not shown by FIG. 8, such as a Data. Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 8). Individual NFs may share a UDSF for storing their respective unstructured data or individual NFs may each have their own UDSF located at or near the individual NFs. Additionally, the UDSF may exhibit an Nudsf service-based interface (not shown by FIG. 8). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 8 for clarity. In one example, the CN 820 may include an Nx interface, which is an inter-CN interface between the MME (e.g., MME 721) and the AMF 821 in order to enable interworking between CN 820 and CN 720. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 9:
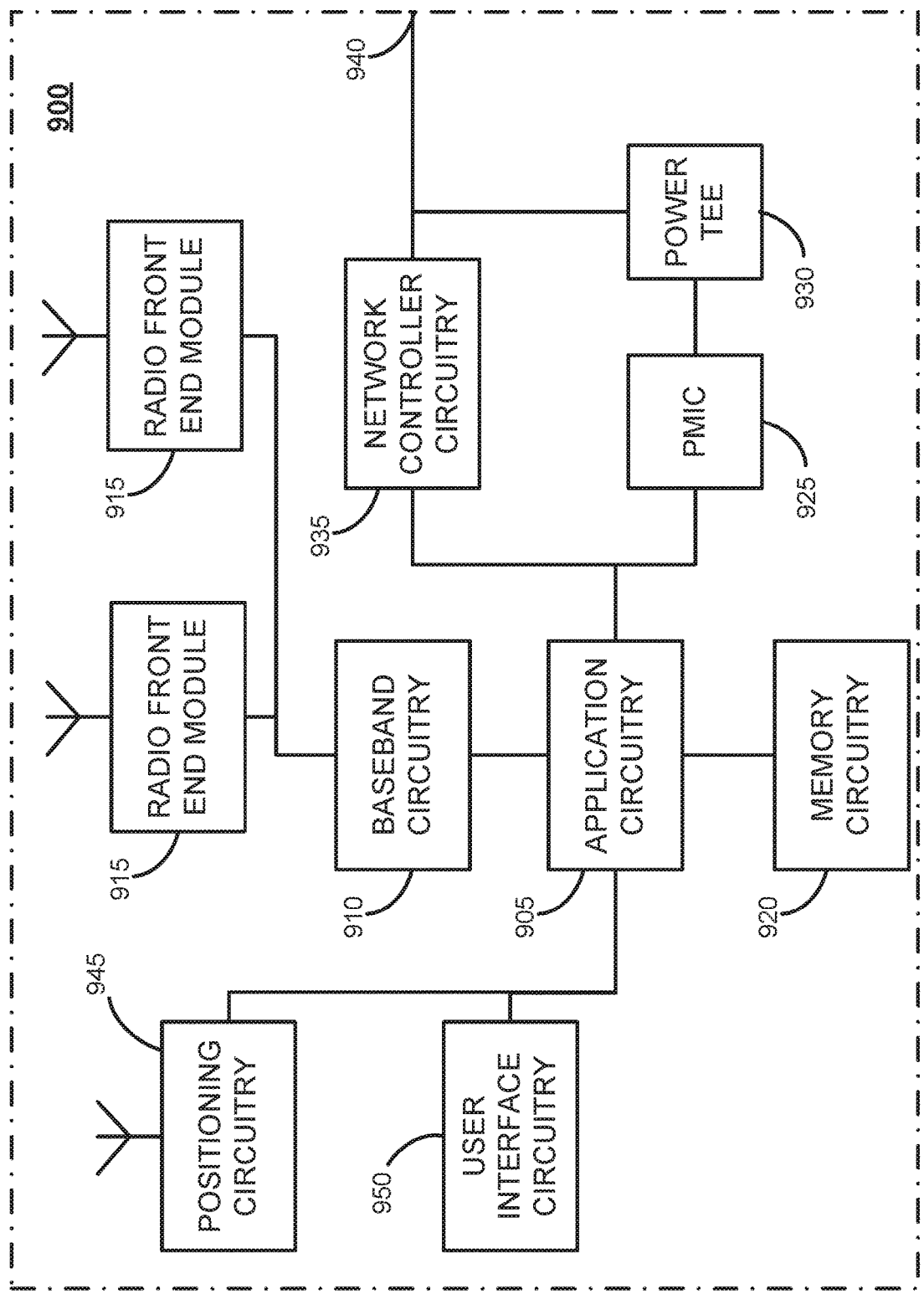
FIG. 9 illustrates an example of infrastructure equipment, according to some implementations of the present disclosure.

FIG. 9 illustrates an example of infrastructure equipment 900 in accordance with various embodiments. The infrastructure equipment 900 (or "system 900") may be implemented as a base station, radio head, RAN node such as the RAN nodes 611 and/or AP 606 shown and described previously, application server(s) 630, and/or any other element/device discussed herein. In other examples, the system 900 could be implemented in or by a UE.

The system 900 includes application circuitry 905, baseband circuitry 910, one or more radio front end modules (RFEMs) 915, memory circuitry 920, power management integrated circuitry (PMIC) 925, power tee circuitry 930, network controller circuitry 935, network interface connector 940, satellite positioning circuitry 945, and user interface 950. In some embodiments, the device 900 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 905 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 905 may be coupled with or may include memory/storage elements and may be configured to execute instructions stored in the memory/storage to enable various applications or operating systems to run on the system 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 905 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 905 may comprise, or may be, a special-purpose processor/controller to operate according to the various embodiments herein. As examples, the processor(s) of application circuitry 905 may include one or more may include one or more Apple A-series processors. Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 900 may not utilize application circuitry 905, and instead may include a special-purpose processor/controller to process IP data received from an EPC or 5GC, for example.

In some implementations, the application circuitry 905 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 905 may comprise logic blocks or logic fabric, and other interconnected resources that may be programmed to perform various functions, such as the procedures, methods, functions, etc. of the various embodiments discussed herein. In such embodiments, the circuitry of application circuitry 905 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like.

The baseband circuitry 910 may be implemented, for example, as a solder-down substrate including one or more integrated circuits, a single packaged integrated circuit soldered to a main circuit board or a multi-chip module containing two or more integrated circuits.

User interface circuitry 950 may include one or more user interfaces designed to enable user interaction with the system 900 or peripheral component interfaces designed to enable peripheral component interaction with the system 900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 915 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 915, which incorporates both mmWave antennas and sub-mmWave.

The memory circuitry 920 may include one or more of volatile memory including dynamic random access memory (DRAM) and/or synchronous dynamic random access memory (SDRAM), and nonvolatile memory (WM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 920 may be implemented as one or more of solder down packaged integrated circuits, socketed memory modules and plug-in memory cards.

The PMIC 925 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 930 may provide for electrical power drawn from a network cable to provide both power supply and data connectivity to the infrastructure equipment 900 using a single cable.

The network controller circuitry 935 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 900 via network interface connector 940 using a physical connection, which may be electrical (commonly referred to as a "copper interconnect"), optical, or wireless. The network controller circuitry 935 may include one or more dedicated processors and/or FPGAs to communicate using one or more of the aforementioned protocols. In some implementations, the network controller circuitry 935 may include multiple controllers to provide connectivity to other networks using the same or different protocols.

The positioning circuitry 945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 945 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 945 may include a Micro-Technology for Positioning, Navigation, and Timing (Micro-PNT) IC that uses a master timing clock to perform position tracking/estimation without GNSS assistance. The positioning circuitry 945 may also be part of, or interact with, the baseband circuitry 910 and/or RFEMs 915 to communicate with the nodes and components of the positioning network. The positioning circuitry 945 may also provide position data and/or time data to the application circuitry 905, which may use the data to synchronize operations with various infrastructure (e.g., RAN nodes 611, etc.), or the like.

The components shown by FIG. 9 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 10:
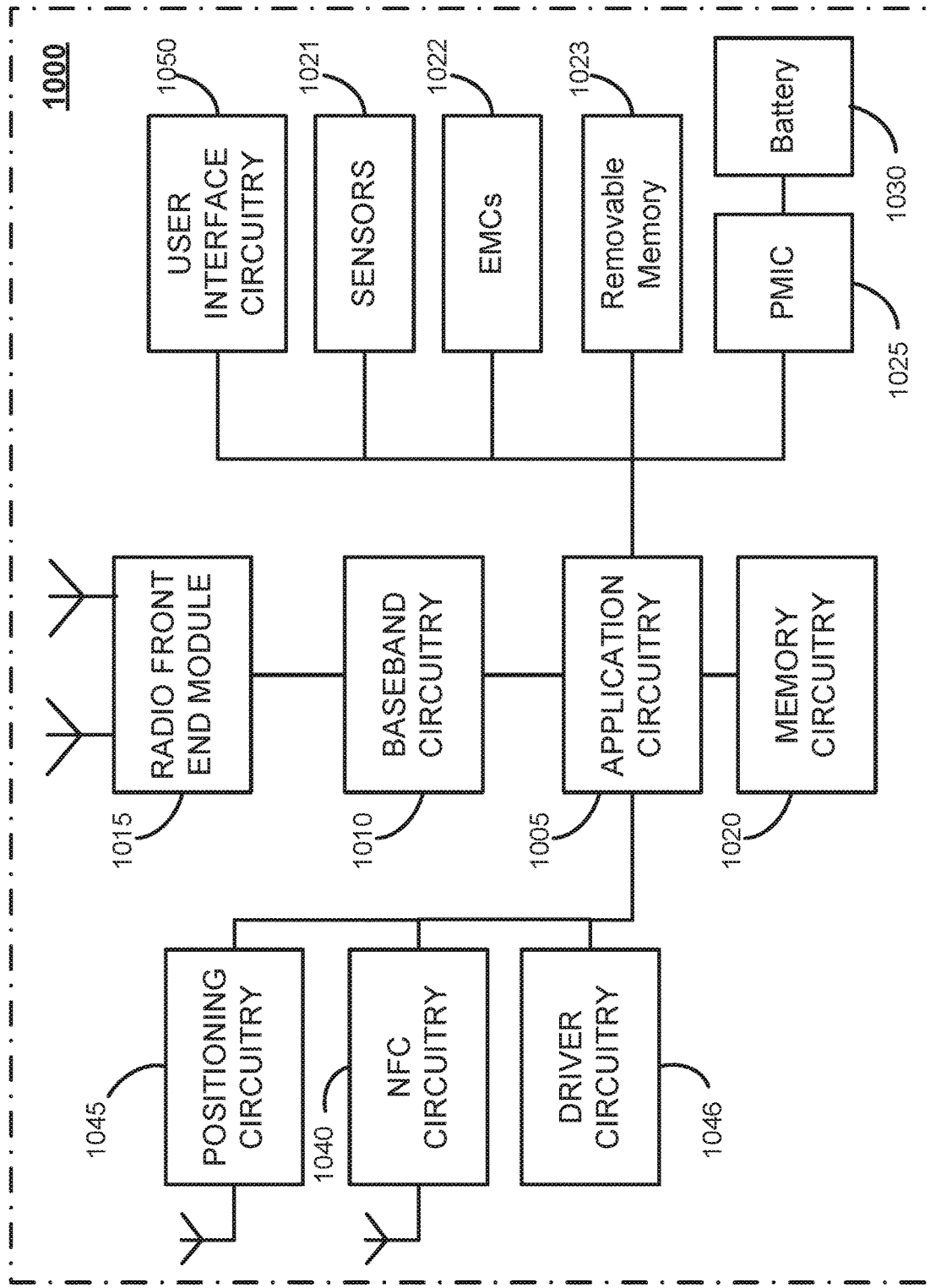
FIG. 10 illustrates an example of a platform, according to some implementations of the present disclosure.

FIG. 10 illustrates an example of a platform 1000 (or "device 1000") in accordance with various embodiments. In embodiments, the computer platform 1000 may be suitable for use as UEs 601, 701, 801, application servers 630, and/or any other element/device discussed herein. The platform 1000 may include any combinations of the components shown in the example. The components of platform 1000 may be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The block diagram of FIG. 10 is intended to show a high level view of components of the computer platform 1000. However, some of the components shown may be omitted, additional components may be present, and different arrangement of the components shown may occur in other implementations.

Application circuitry 1005 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 905 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 905 may comprise, or may be, a special-purpose processor/controller to operate according to the various embodiments herein.

As examples, the processor(s) of application circuitry 1005 may include an Apple A-series processor. The processors of the application circuitry 1005 may also be one or more of Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies. Inc., Texas Instruments. Inc.® Open Multimedia Applications Platform (GMAP)™ processor(s); a MIPS-based design from MIPS Technologies. Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1005 may be a part of a system on a chip (SoC) in which the application circuitry 1005 and other components are formed into a single integrated circuit.

Additionally or alternatively, application circuitry 1005 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1005 may comprise logic blocks or logic fabric, and other interconnected resources that may be programmed to perform various functions, such as the procedures, methods, functions, etc. of the various embodiments discussed herein. In such embodiments, the circuitry of application circuitry 1005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1010 may be implemented, for example, as a solder-down substrate including one or more integrated circuits, a single packaged integrated circuit soldered to a main circuit board or a multi-chip module containing two or more integrated circuits.

The RFEMs 1015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1015, which incorporates both mmWave antennas and sub-mmWave.

The memory circuitry 1020 may include any number and type of memory devices used to provide for a given amount of system memory. As examples, the memory circuitry 1020 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1020 may be developed in accordance with a Joint Electron Devices Engineering Council (JEDEC) low power double data rate (LPDDR)-based design, such as LPDDR2, LPDDR3, LPDDR4, or the like. Memory circuitry 1020 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1020 may be on-die memory or registers associated with the application circuitry 1005. To provide for persistent storage of information such as data, applications, operating systems and so forth, memory circuitry 1020 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1000 may incorporate the three-dimensional (3D) cross-point (XPOINT) memories from Intel® and Micron®.

Removable memory circuitry 1023 may include devices, circuitry, enclosures/housings, ports or receptacles, etc. used to couple portable data storage devices with the platform 1000. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1000 may also include interface circuitry (not shown) that is used to connect external devices with the platform 1000. The external devices connected to the platform 1000 via the interface circuitry include sensor circuitry 1021 and electro-mechanical components (EMCs) 1022, as well as removable memory devices coupled to removable memory circuitry 1023.

The sensor circuitry 1021 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1022 include devices, modules, or subsystems whose purpose is to enable platform 1000 to change its state, position, and/or orientation, or move or control a mechanism or (sub)system. Additionally, EMCs 1022 may be configured to generate and send messages/signalling to other components of the platform 1000 to indicate a current state of the EMCs 1022. Examples of the EMCs 1022 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1000 is configured to operate one or more EMCs 1022 based on one or more captured events and/or instructions or control signals received from a service provider and/or various clients.

In some implementations, the interface circuitry may connect the platform 1000 with positioning circuitry 1045. The positioning circuitry 1045 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1045 may include a Micro-PNT IC that uses a master timing clock to perform position tracking/estimation without GNSS assistance. The positioning circuitry 1045 may also be part of, or interact with, the baseband circuitry 910 and/or RFEMs 1015 to communicate with the nodes and components of the positioning network. The positioning circuitry 1045 may also provide position data and/or time data to the application circuitry 1005, which may use the data to synchronize operations with various infrastructure (e.g., radio base stations), for turn-by-turn navigation applications, or the like In some implementations, the interface circuitry may connect the platform 1000 with Near-Field Communication (NFC) circuitry 1040. NFC circuitry 1040 is configured to provide contactless, short-range communications based on radio frequency identification (RFID) standards, wherein magnetic field induction is used to enable communication between NFC circuitry 1040 and NFC-enabled devices external to the platform 1000 (e.g., an "NFC touchpoint"). NFC circuitry 1040 comprises an NFC controller coupled with an antenna element and a processor coupled with the NFC controller. The NFC controller may be a chip/IC providing NFC functionalities to the NFC circuitry 1040 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1040, or initiate data transfer between the NFC circuitry 1040 and another active NFC device (e.g., a smartphone or an NFC-enabled POS terminal) that is proximate to the platform 1000.

The driver circuitry 1046 may include software and hardware elements that operate to control particular devices that are embedded in the platform 1000, attached to the platform 1000, or otherwise communicatively coupled with the platform 1000. The driver circuitry 1046 may include individual drivers allowing other components of the platform 1000 to interact with or control various input/output (I/O) devices that may be present within, or connected to, the platform 1000. For example, driver circuitry 1046 may include a display driver to control and allow access to a display device, a touchscreen driver to control and allow access to a touchscreen interface of the platform 1000, sensor drivers to obtain sensor readings of sensor circuitry 1021 and control and allow access to sensor circuitry 1021, EMC drivers to obtain actuator positions of the EMCs 1022 and/or control and allow access to the EMCs 1022, a camera driver to control and allow access to an embedded image capture device, audio drivers to control and allow access to one or more audio devices.

The power management integrated circuitry (PMIC) 1025 (also referred to as "power management circuitry 1025") may manage power provided to various components of the platform 1000. In particular, with respect to the baseband circuitry 1010, the PMIC 1025 may control power-source selection, voltage scaling, battery charging, or DC-to-DC conversion. The PMIC 1025 may often be included when the platform 1000 is capable of being powered by a battery 1030, for example, when the device is included in a UE 601, 701, 801.

In some embodiments, the PMIC 1025 may control, or otherwise be part of, various power saving mechanisms of the platform 1000. For example, if the platform 1000 is in an RRC_Connected state, where it is still connected to the RAN node as it expects to receive traffic shortly, then it may enter a state known as Discontinuous Reception Mode (DRX) after a period of inactivity. During this state, the platform 1000 may power down for brief intervals of time and thus save power. If there is no data traffic activity for an extended period of time, then the platform 1000 may transition off to an RRC_Idle state, where it disconnects from the network and does not perform operations such as channel quality feedback, handover, etc. The platform 1000 goes into a very low power state and it performs paging where again it periodically wakes up to listen to the network and then powers down again. The platform 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1030 may power the platform 1000, although in some examples the platform 1000 may be mounted deployed in a fixed location, and may have a power supply coupled to an electrical grid. The battery 1030 may be a lithium ion battery, a metal-air battery, such as a zinc-air battery, an aluminum-air battery, a lithium-air battery, and the like. In some implementations, such as in V2X applications, the battery 1030 may be a typical lead-acid automotive battery.

In some implementations, the battery 1030 may be a "smart battery," which includes or is coupled with a Battery Management System (BMS) or battery monitoring integrated circuitry. The BMS may be included in the platform 1000 to track the state of charge (SoCh) of the battery 1030. The BMS may be used to monitor other parameters of the battery 1030 to provide failure predictions, such as the state of health (SOLI) and the state of function (SoF) of the battery 1030. The BMS may communicate the information of the battery 1030 to the application circuitry 1005 or other components of the platform 1000. The BMS may also include an analog-to-digital (ADC) convertor that allows the application circuitry 1005 to directly monitor the voltage of the battery 1030 or the current flow from the battery 1030. The battery parameters may be used to determine actions that the platform 1000 may perform, such as transmission frequency, network operation, sensing frequency, and the like.

A power block, or other power supply coupled to an electrical grid may be coupled with the BMS to charge the battery 1030. In some examples, the power block XS30 may be replaced with a wireless power receiver to obtain the power wirelessly, for example, through a loop antenna in the computer platform 1000. In these examples, a wireless battery charging circuit may be included in the BMS. The specific charging circuits chosen may depend on the size of the battery 1030, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1050 includes various input/output (I/O) devices present within, or connected to, the platform 1000, and includes one or more user interfaces designed to enable user interaction with the platform 1000 and/or peripheral component interfaces designed to enable peripheral component interaction with the platform 1000. The user interface circuitry 1050 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/ or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1000. The output device circuitry may also include speakers or other audio emitting devices, printer(s), and/or the like. In some embodiments, the sensor circuitry 1021 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NEC controller coupled with an antenna element and a processing device may be included to read electronic tags and/or connect with another NEC-enabled device. Peripheral component interfaces may include, but are not limited to, a non-volatile memory port, a USB port, an audio jack, a power supply interface, etc.

Although not shown, the components of platform 1000 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 11:
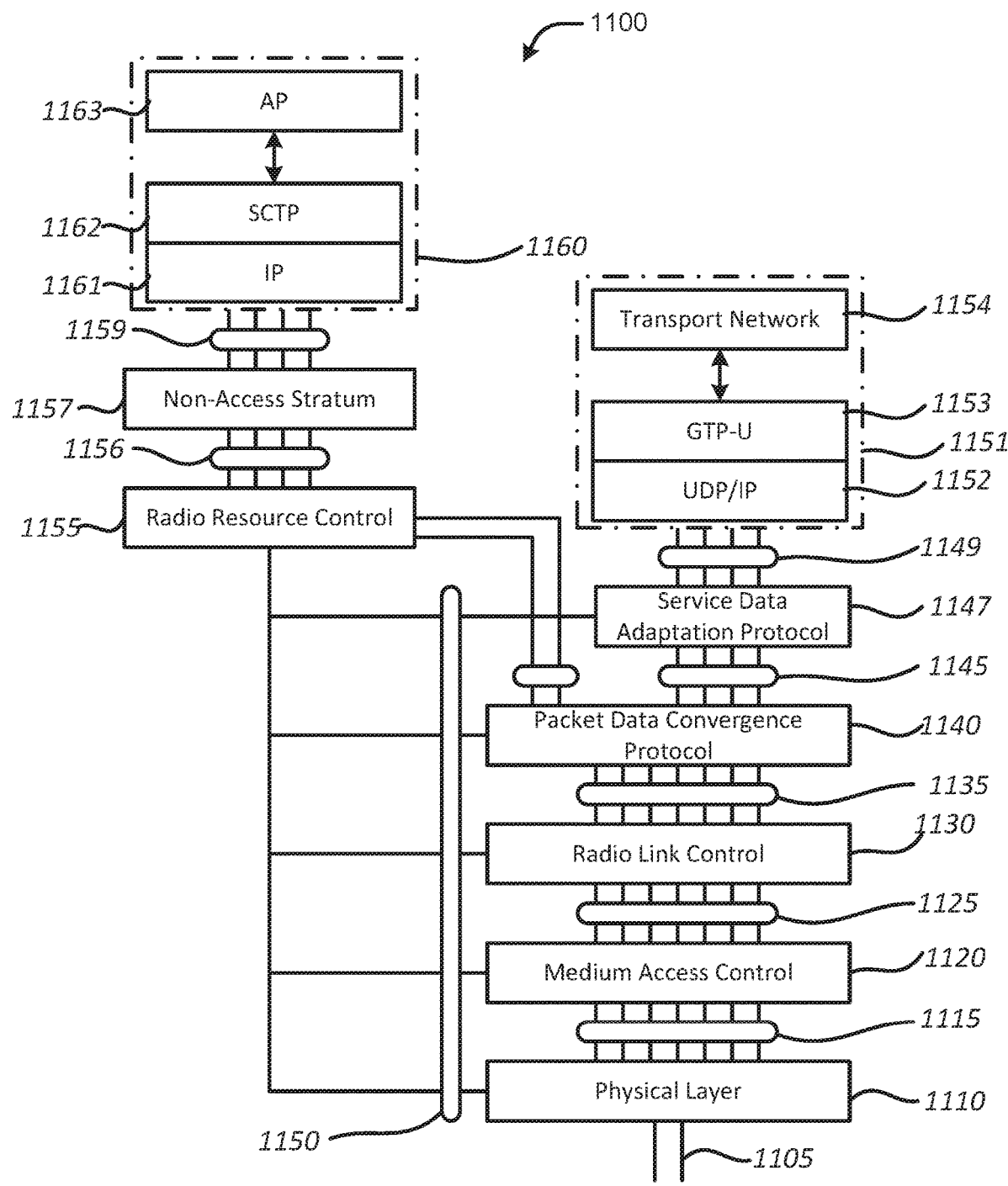
FIG. 11 illustrates various protocol functions that may be implemented in a wireless communication device, according to some implementations of the present disclosure.

FIG. 11 illustrates various protocol functions that may be implemented in a wireless communication device according to various embodiments. In particular, FIG. 11 includes an arrangement 1100 showing interconnections between various protocol layers/entities. The following description of FIG. 11 is provided for various protocol layers/entities that operate in conjunction with the 5G/NR system standards and LTE system standards, but some or all of the aspects of FIG. 11 may be applicable to other wireless communication network systems as well.

The protocol layers of arrangement 1100 may include one or more of PHY 1110, MAC 1120, RLC 1130, PDCP 1140, SDAP 1147, RRC 1155, and NAS layer 1157, in addition to other higher layer functions not illustrated. The protocol layers may include one or more service access points (e.g., items 1159, 1156, 1150, 1149, 1145, 1135, 1125, and 1115 in FIG. 11) that may provide communication between two or more protocol layers.

The PHY 1110 may transmit and receive physical layer signals 1105 that may be received from or transmitted to one or more other communication devices. The physical layer signals 1105 may comprise one or more physical channels, such as those discussed herein. The PHY 1110 may further perform link adaptation or adaptive modulation and coding (AMC), power control, cell search (e.g., for initial synchronization and handover purposes), and other measurements used by higher layers, such as the RRC 1155. The PHY 1110 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1110 may process requests from and provide indications to an instance of MAC 1120 via one or more PHY-SAP 1115. According to some embodiments, requests and indications communicated via PHY-SAP 1115 may comprise one or more transport channels.

Instance(s) of MAC 1120 may process requests from, and provide indications to, an instance of RLC 1130 via one or more MAC-SAPs 1125. These requests and indications communicated via the MAC-SAP 1125 may comprise one or more logical channels. The MAC 1120 may perform mapping between the logical channels and transport channels, multiplexing of MAC SDUs from one or more logical channels onto TBs to be delivered to PHY 1110 via the transport channels, de-multiplexing MAC SDUs to one or more logical channels from TBs delivered from the PHY 1110 via transport channels, multiplexing MAC SDUs onto TBs, scheduling information reporting, error correction through HARQ, and logical channel prioritization.

Instance(s) of RLC 1130 may process requests from and provide indications to an instance of PDCP 1140 via one or more radio link control service access points (RLC-SAP) 1135. These requests and indications communicated via RLC-SAP 1135 may comprise one or more RLC channels. The RLC 1130 may operate in a plurality of modes of operation, including: Transparent Mode (TM), Unacknowledged Mode (UM), and Acknowledged Mode (AM). The RLC 1130 may execute transfer of upper layer protocol data units (PDUs), error correction through automatic repeat request (ARQ) for AM data transfers, and concatenation, segmentation and reassembly of RLC SDUs for UM and AM data transfers. The RLC 1130 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1140 may process requests from and provide indications to instance(s) of RRC 1155 and/or instance(s) of SDAP 1147 via one or more packet data convergence protocol service access points (PDCP-SAP) 1145. These requests and indications communicated via PDCP-SAP 1145 may comprise one or more radio bearers. The PDCP 1140 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.), Instance(s) of SDAP 1147 may process requests from and provide indications to one or more higher layer protocol entities via one or more SDAP-SAP 1149. These requests and indications communicated via SDAP-SAP 1149 may comprise one or more QoS flows. The SDAP 1147 may map QoS flows to DRBs, and vice versa, and may also mark QFIs in DL and UL packets. A single SDAP entity 1147 may be configured for an individual PDU session. In the UL direction, the NG-RAN 610 may control the mapping of QoS Flows to DRB(s) in two different ways, reflective mapping or explicit mapping. For reflective mapping, the SDAP 1147 of a UE 601 may monitor the QFIs of the DL packets for each DRB, and may apply the same mapping for packets flowing in the UL direction. For a DRB, the SDAP 1147 of the UE 601 may map the UL packets belonging to the QoS flows(s) corresponding to the QoS flow ID(s) and PDU session observed in the DL packets for that DRB. To enable reflective mapping, the NG-RAN 810 may mark DL packets over the Uu interface with a QoS flow ID. The explicit mapping may involve the RRC 1155 configuring the SDAP 1147 with an explicit QoS flow to DRB mapping rule, which may be stored and followed by the SDAP 1147. In embodiments, the SDAP 1147 may only be used in NR implementations and may not be used in LTE implementations.

The RRC 1155 may configure, via one or more management service access points (M-SAP), aspects of one or more protocol layers, which may include one or more instances of PHY 1110, MAC 1120, RLC 1130, PDCP 1140 and SDAP 1147. In embodiments, an instance of RRC 1155 may process requests from and provide indications to one or more NAS entities 1157 via one or more RRC-SAPs 1156. The main services and functions of the RRC 1155 may include broadcast of system information (e.g., included in MIBs or SIBs related to the NAS), broadcast of system information related to the access stratum (AS), paging, establishment, maintenance and release of an RRC connection between the UE 601 and RAN 610 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1157 may form the highest stratum of the control plane between the UE 601 and the AMF 821. The NAS 1157 may support the mobility of the UEs 601 and the session management procedures to establish and maintain IP connectivity between the UE 601 and a P-GW in LTE systems.

According to various embodiments, one or more protocol entities of arrangement 1100 may be implemented in UEs 601, RAN nodes 611, AMF 821 in NR implementations or MMF 721 in LTE implementations, UPF 802 in NR implementations or S-GW 722 and P-GW 723 in LTE implementations, or the like to be used for control plane or user plane communications protocol stack between the aforementioned devices. In such embodiments, one or more protocol entities that may be implemented in one or more of UE 601, gNB 611, AMF 821, etc. may communicate with a respective peer protocol entity that may be implemented in or on another device using the services of respective lower layer protocol entities to perform such communication. In some embodiments, a gNB-CU of the gNB 611 may host the RRC 1155, SDAP 1147, and PDCP 1140 of the gNB that controls the operation of one or more gNB-DUs, and the gNB-DUs of the gNB 611 may each host the RLC 1130, MAC 1120, and PHY 1110 of the gNB 611.

In a first example, a control plane protocol stack may comprise, in order from highest layer to lowest layer, NAS 1157, RRC 1155, PDCP 1140, RLC 1130, MAC 1120, and PHY 1110. In this example, upper layers 1160 may be built on top of the NAS 1157, which includes an IP layer 1161, an SCTP 1162, and an application layer signaling protocol (AP) 1163.

In NR implementations, the AP 1163 may be an NG application protocol layer (NGAP or NG-AP) 1163 for the NG interface 613 defined between the NG-RAN node 611 and the AMF 821, or the AP 1163 may be an Xn application protocol layer (XnAP or Xn-AP) 1163 for the Xn interface 612 that is defined between two or more RAN nodes 611.

The NG-AP 1163 may support the functions of the NG interface 613 and may comprise Elementary Procedures (EPs). An NG-AP EP may be a unit of interaction between the NG-RAN node 611 and the AMF 821. The NG-AP 1163 services may comprise two groups: UE-associated services (e.g., services related to a UE 601) and non-UE-associated services (e.g., services related to the whole NG interface instance between the NG-RAN node 611 and AMF 821). These services may include functions including, but not limited to: a paging function for the sending of paging requests to NG-RAN nodes 611 involved in a particular paging area; a UE context management function for allowing the AMF 821 to establish, modify, and/or release a UE context in the AMF 821 and the NG-RAN node 611; a mobility function for UEs 601 in ECM-CONNECTED mode for intra-system HOs to support mobility within NG-RAN and inter-system HOs to support mobility from/to EPS systems; a NAS Signaling Transport function for transporting or rerouting NAS messages between UE 601 and AMF 821; a NAS node selection function for determining an association between the AMF 821 and the UE 601; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 611 via CN 620; and/or other like functions.

The XnAP 1163 may support the functions of the Xn interface 612 and may comprise XnAP basic mobility procedures and XnAP global procedures. The XnAP basic mobility procedures may comprise procedures used to handle UE mobility within the NG RAN 611 (or E-UTRAN 710), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 601, such as Xn interface setup and reset procedures, NG-RAN update procedures, cell activation procedures, and the like.

In LTE implementations, the AP 1163 may be an S1 Application Protocol layer (S1-AP) 1163 for the S1 interface 613 defined between an E-UTRAN node 611 and an MME, or the AP 1163 may be an X2 application protocol layer (X2AP or X2-AP) 1163 for the X2 interface 612 that is defined between two or more E-UTRAN nodes 611.

The S1 Application Protocol layer (S1-AP) 1163 may support the functions of the S1 interface, and similar to the NG-AP discussed previously, the S1-AP may comprise S1-AP EPs. An S1-AP EP may be a unit of interaction between the E-UTRAN node 611 and an MME 721 within an LTE CN 620. The S1-AP 1163 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1163 may support the functions of the X2 interface 612 and may comprise X2AP basic mobility procedures and X2AP global procedures. The X2AP basic mobility procedures may comprise procedures used to handle UE mobility within the E-UTRAN 620, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 601, such as X2 interface setup and reset procedures, load indication procedures, error indication procedures, cell activation procedures, and the like.

The SCTP layer (alternatively referred to as the SCTP/IP layer) 1162 may provide guaranteed delivery of application layer messages (e.g., NGAP or XnAP messages in NR implementations, or S1-AP or X2AP messages in LTE implementations). The SCTP 1162 may ensure reliable delivery of signaling messages between the RAN node 611 and the AMF 821/MME 721 based, in part, on the IP protocol, supported by the IP 1161. The Internet Protocol layer (IP) 1161 may be used to perform packet addressing and routing functionality. In some implementations the IP layer 1161 may use point-to-point transmission to deliver and convey PDUs. In this regard, the RAN node 611 may comprise L2 and L1 layer communication links (e.g., wired or wireless) with the MME/AMF to exchange information.

In a second example, a user plane protocol stack may comprise, in order from highest layer to lowest layer, SDAP 1147, PDCP 1140, RLC 1130, MAC 1120, and PHY 1110. The user plane protocol stack may be used for communication between the UE 601, the RAN node 611, and UPF 802 in NR implementations or an S-GW 722 and P-GW 723 in LTE implementations. In this example, upper layers 1151 may be built on top of the SDAP 1147, and may include a user datagram protocol (UDP) and IP security layer (UDP/IP) 1152, a General Packet Radio Service (GPRS) Tunneling Protocol for the user plane layer (GTP-U) 1153, and a User Plane PDU layer (UP PDU) 1163.

The transport network layer 1154 (also referred to as a "transport layer") may be built on IP transport, and the GTP-U 1153 may be used on top of the UDP/IP layer 1152 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1153 may be used for carrying user data within the GPRS core network and between the radio access network and the core network. The user data transported can be packets in any of IPv4, IPv6, or PPP formats, for example. The UDP/IP 1152 may provide checksums for data integrity, port numbers for addressing different functions at the source and destination, and encryption and authentication on the selected data flows. The RAN node 611 and the S-GW 722 may utilize an S1-U interface to exchange user plane data via a protocol stack comprising an L1 layer (e.g., PHY 1110), an L2 layer (e.g., MAC 1120, RLC 1130, PDCP 1140, and/or SDAP 1147), the UDP/IP layer 1152, and the GTP-U 1153. The S-GW 722 and the P-GW 723 may utilize an S5/S8a interface to exchange user plane data via a protocol stack comprising an L1 layer, an L2 layer, the UDP/IP layer 1152, and the GTP-U 1153. As discussed previously, NAS protocols may support the mobility of the UE 601 and the session management procedures to establish and maintain IP connectivity between the UE 601 and the P-GW 723.

Moreover, although not shown by FIG. 11, an application layer may be present above the AP 1163 and/or the transport network layer 1154. The application layer may be a layer in which a user of the UE 601, RAN node 611, or other network element interacts with software applications being executed, for example, by application circuitry 905 or application circuitry 1005, respectively. The application layer may also provide one or more interfaces for software applications to interact with communications systems of the UE 601 or RAN node 611, such as the baseband circuitry XT110. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

With respect to 5G systems (see, e.g., FIG. 8), a network slice always comprises a RAN part and a CN part. The support of network slicing relies on the principle that traffic for different slices is handled by different PDU sessions. The network can realize the different network slices by scheduling and also by providing different L1/L2 configurations. The UE 801 provides assistance information for network slice selection in an appropriate RRC message, if it has been provided by NAS. While the network can support large number of slices, the UE need not support more than 8 slices simultaneously.

A network slice may include the CN 820 control plane and user plane NFs, NG-RANs 810 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 801 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 821 instance serving an individual UE 801 may belong to each of the network slice instances serving that UE.

Network Slicing in the NG-RAN 810 involves RAN slice awareness. RAN slice awareness includes differentiated handling of traffic for different network slices, which have been pre-configured. Slice awareness in the NG-RAN 810 is introduced at the PDU session level by indicating the S-NSSAI corresponding to a PDU session in all signaling that includes PDU session resource information. How the NG-RAN 810 supports the slice enabling in terms of NG-RAN functions (e.g., the set of network functions that comprise each slice) is implementation dependent. The NG-RAN 810 selects the RAN part of the network slice using assistance information provided by the UE 801 or the 5GC 820, which unambiguously identifies one or more of the pre-configured network slices in the PLMN. The NG-RAN 810 also supports resource management and policy enforcement between slices as per SLAs. A single NG-RAN node may support multiple slices, and the NG-RAN 810 may also apply an appropriate RRM policy for the SLA in place to each supported slice. The NG-RAN 810 may also support QoS differentiation within a slice.

The NG-RAN 810 may also use the UE assistance information for the selection of an AMF 821 during an initial attach, if available. The NG-RAN 810 uses the assistance information for routing the initial NAS to an AMF 821. If the NG-RAN 810 is unable to select an AMF 821 using the assistance information, or the UE 801 does not provide any such information, the NG-RAN 810 sends the NAS signaling to a default AMF 821, which may be among a pool of AMFs 821. For subsequent accesses, the UE 801 provides a temp ID, which is assigned to the UE 801 by the 5GC 820, to enable the NG-RAN 810 to route the NAS message to the appropriate AMF 821 as long as the temp ID is valid. The NG-RAN 810 is aware of, and can reach, the AMF 821 that is associated with the temp ID. Otherwise, the method for initial attach applies.

The NG-RAN 810 supports resource isolation between slices. NG-RAN 810 resource isolation may be achieved by means of RRM policies and protection mechanisms that should avoid that shortage of shared resources if one slice breaks the service level agreement for another slice. In some implementations, it is possible to fully dedicate NG-RAN 810 resources to a certain slice. How NG-RAN 810 supports resource isolation is implementation dependent.

Some slices may be available only in part of the network. Awareness in the NG-RAN 810 of the slices supported in the cells of its neighbors may be beneficial for inter-frequency mobility in connected mode. The slice availability may not change within the UE's registration area. The NG-RAN 810 and the 5GC 820 are responsible to handle a service request for a slice that may or may not be available in a given area. Admission or rejection of access to a slice may depend on factors such as support for the slice, availability of resources, support of the requested service by NG-RAN 810.

The UE 801 may be associated with multiple network slices simultaneously. In case the UE 801 is associated with multiple slices simultaneously, only one signaling connection is maintained, and for intra-frequency cell reselection, the UE 801 tries to camp on the best cell. For inter-frequency cell reselection, dedicated priorities can be used to control the frequency on which the UE 801 camps. The 5GC 820 is to validate that the UE 801 has the rights to access a network slice. Prior to receiving an Initial Context Setup Request message, the NG-RAN 810 may be allowed to apply some provisional/local policies, based on awareness of a particular slice that the UE 801 is requesting to access. During the initial context setup, the NG-RAN 810 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 12:
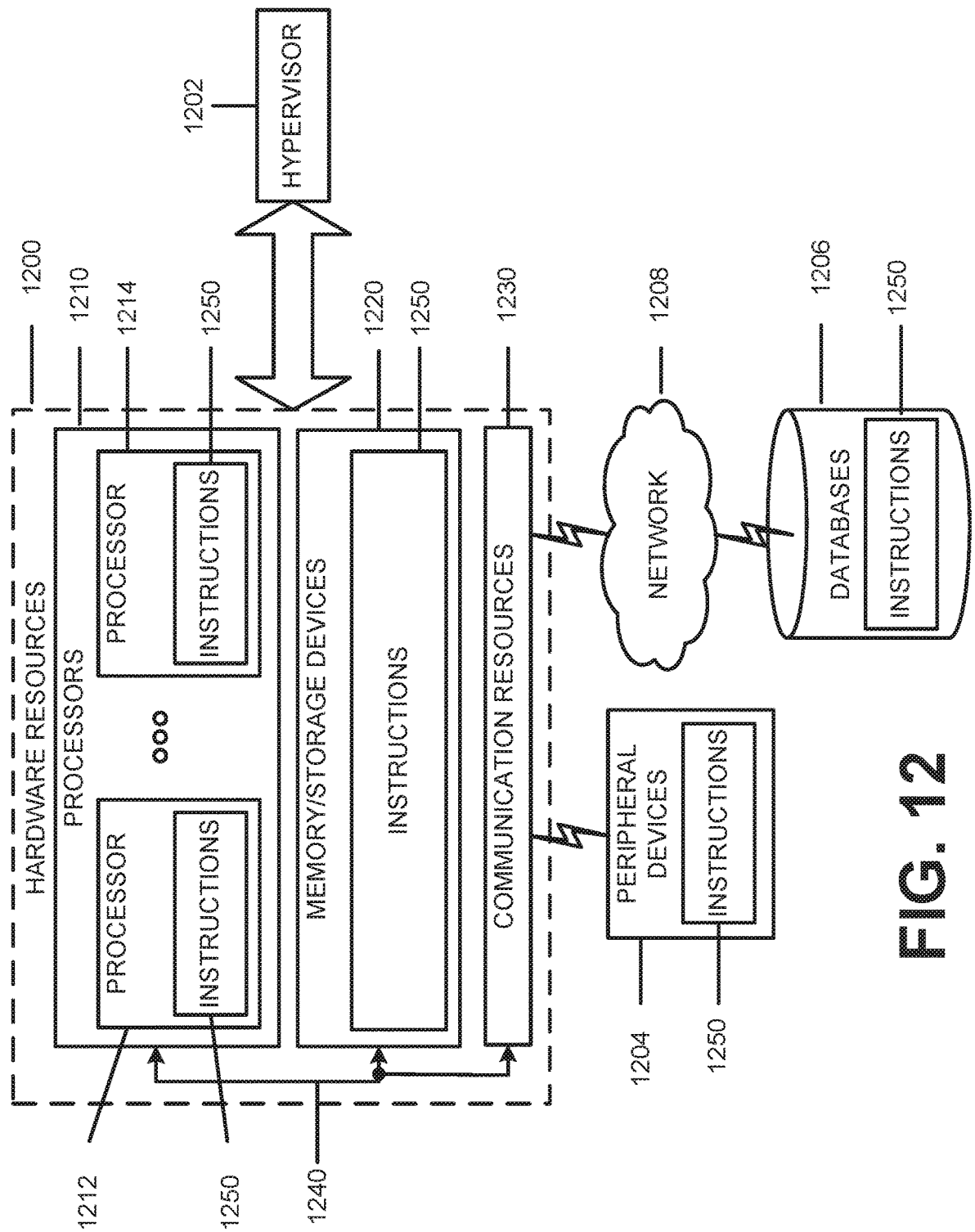
FIG. 12 illustrates a block diagram illustrating components able to read instructions from a machine-readable or computer-readable medium (e.g., a non-transitory machine-readable storage medium) and perform any one or more of the methodologies described herein, according to some implementations of the present disclosure.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 may include, for example, a processor 1212 and a processor 1214. The processor(s) 1210 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1220 may include main memory, disk storage, or any suitable combination thereof. The memory/storage devices 1220 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via USB), cellular communication components, NFC components, Bluetooth® (or Bluetooth® Low Energy) components, Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

What is claimed is:

1. In an integrated access and backhaul (IAB) network including an IAB node, a method comprising:
   determining, using by one or more processors of the IAB node, a time-domain soft resource configuration for a distributed unit (DU) of the IAB node, wherein determining the time-domain soft resource configuration comprises:
   receiving a go-to-sleep (GTS) downlink control information (DCI); and
   in response to receiving the GTS DCI, suspending mobile termination (MT) control channel (CCH) monitoring for a number of slots indicated by the GTS DCI; and
   allocating, using the one or more processors, the time-domain soft resource configuration for the DU, wherein the time-domain soft resource configuration comprises available soft resources for an MT GTS duration.

2. The method of claim 1, wherein the time-domain soft resource configuration is a first time-domain soft resource configuration, and the method further comprising:
   configuring, by the one or more processors, control channel (CCH) allocations for the MT and the DU such that a DU CCH is allocated in a symbol after a resource allocated for an MT CCH.

3. The method of claim 2, further comprising determining, by the one or more processors, a second time-domain soft resource configuration for the DU, wherein determining the second time-domain soft resource configuration comprises:
   determining that the resource allocated for the MT CCH does not include the MT CCH;
   in response to the determination, determining that a data resource corresponding to the resource allocated for the MT CCH is not used by the MT; and
   generating the second soft resource configuration to indicate a second available soft resource for use by the DU, wherein the second available soft resource includes the data resource that is not used by the MT.

4. The method of claim 3, wherein the DU is configured to initiate a child link using the DU CCH allocated in a DU CCH region indicated by the second time-domain soft resource configuration.

5. The method of claim 2, further comprising:
   scheduling a gap time between an end of the MT CCH and a start of the DU CCH, wherein the gap time is a time period to accommodate at least one of an MT CCH decoding delay or a DU data channel preparation time.

6. The method of claim 1, wherein the suspending comprises the one or more processors not scheduling transmissions in a parent link of the IAB node in slots that correspond to the number of slots indicated by the GTS DCI.

7. The method of claim 1, wherein the time-domain soft resource configuration is a first time-domain soft resource configuration, and wherein determining a second time-domain soft resource configuration comprises:
   determining one or more rate matching (RM) patterns, the one or more RM patterns comprising an RM resource allocation for MT data transmissions.

8. The method of claim 7, further comprising:
   receiving, by the one or more processors, a DCI scheduling an MT data transmission, wherein the DCI is used to dynamically select one of the one or more RM patterns to be rate matched around for the data transmission.

9. The method of claim 8, further comprising:
determining, in response to receipt of the DCI and by the one or more processors, a corresponding second available soft resource for the DU, wherein the corresponding second available soft resource is a rate matched resource according to the selected RM pattern.

10. In an integrated access and backhaul (IAB) network including an IAB node, a non-transitory computer-readable storage device having stored thereon instructions, which, when executed by a data processing apparatus, cause the data processing apparatus to perform operations comprising:
determining a time-domain soft resource configuration for a distributed unit (DU) of the IAB node, wherein determining the time-domain soft resource configuration comprises:
determining one or more rate matching (RM) patterns, the one or more RM patterns comprising an RM resource allocation for mobile termination (MT) data transmissions; and
receiving a downlink control information (DCI) scheduling an MT data transmission, wherein the DCI is used to dynamically select one of the one or more RM patterns to be rate matched around for the data transmission; and
allocating the time-domain soft resource configuration to the DU.

11. The non-transitory computer-readable storage device of claim 10, wherein control channel (CCH) allocations for the MT and the DU are configured such that a DU CCH is allocated in a symbol after a resource allocated for an MT CCH.

12. The non-transitory computer-readable storage device of claim 11, wherein the time-domain soft resource configuration is a first time-domain soft resource configuration, and wherein determining a second time-domain soft resource configuration for the DU of the IAB node comprises:
determining that the resource allocated for the MT CCH does not include the MT CCH;
in response to the determination, determining that a data resource corresponding to the resource allocated for the MT CCH is not used by the MT; and
generating the second time-domain soft resource configuration to indicate an available soft resource for use by the DU, wherein the available soft resource includes the data resource that is not used by the MT.

13. The non-transitory computer-readable storage device of claim 12, wherein, upon receipt of the second time-domain soft resource configuration, the DU is configured to initiate a child link using the DU CCH allocated in a DU CCH region indicated by the second time-domain soft resource configuration.

14. The non-transitory computer-readable storage device of claim 11, the operations further comprising:
scheduling a gap time between an end of the MT CCH and a start of the DU CCH, wherein the gap time is a time period to accommodate at least one of an MT CCH decoding delay or a DU data channel preparation time.

15. The non-transitory computer-readable storage device of claim 10, wherein the time-domain soft resource configuration is a first time-domain soft resource configuration, and wherein determining a second time-domain soft resource configuration for the DU of the IAB node comprises:
receiving a go-to-sleep (GTS) downlink control information (DCI);
in response to receiving the GTS DCI, suspending MT control channel (CCH) monitoring for a number of slots indicated by the GTS DCI; and
indicating available soft resources for a MT GTS duration to the DU.

16. The non-transitory computer-readable storage device of claim 15, wherein the suspending comprises not scheduling transmissions in a parent link of the IAB node in slots that correspond to the number of slots indicated by the GTS DCI.

17. One or more processors configured to perform operations comprising:
determining a time-domain soft resource configuration for a distributed unit (DU) of an integrated access and backhaul (IAB) node, wherein determining the time-domain soft resource configuration comprises:
receiving a go-to-sleep (GTS) downlink control information (DCI); and
in response to receiving the GTS DCI, suspending mobile termination (MT) control channel (CCH) monitoring for a number of slots indicated by the GTS DCI; and
allocating the soft resource configuration to the DU.

18. The one or more processors of claim 17, wherein the time-domain soft resource configuration is a first time-domain soft resource configuration, and the operations further comprising:
configuring, by the one or more processors, control channel (CCH) allocations for the MT and the DU such that a DU CCH is allocated in a symbol after a resource allocated for an MT CCH.

19. The one or more processors of claim 18, the operations further comprising determining, by the one or more processors, a second time-domain soft resource configuration for the DU, wherein determining the second time-domain soft resource configuration comprises:
determining that the resource allocated for the MT CCH does not include the MT CCH;
in response to the determination, determining that a data resource corresponding to the resource allocated for the MT CCH is not used by the MT; and
generating the second soft resource configuration to indicate a second available soft resource for use by the DU, wherein the second available soft resource includes the data resource that is not used by the MT.

20. The one or more processors of claim 19, wherein the DU is configured to initiate a child link using the DU CCH allocated in a DU CCH region indicated by the second time-domain soft resource configuration.

* * * * *